(12) United States Patent
Hori et al.

(10) Patent No.: US 7,752,461 B2
(45) Date of Patent: Jul. 6, 2010

(54) STORAGE APPARATUS THAT CAN PROPERLY RECOMMENCE INPUT AND OUTPUT OF CLASSIFIED DATA

(75) Inventors: Yoshihiro Hori, Gifu (JP); Tatsuya Hirai, Kawasaki (JP)

(73) Assignees: Sanyo Electric Co., Ltd., Moriguchi-shi (JP); Hitachi Global Storage Technologies Japan, Ltd., Kanagawa-ken (JP)

( * ) Notice: Subject to any disclaimer, the term of this patent is extended or adjusted under 35 U.S.C. 154(b) by 1005 days.

(21) Appl. No.: 10/340,832

(22) Filed: Jan. 13, 2003

(65) Prior Publication Data

US 2003/0200458 A1 Oct. 23, 2003

(30) Foreign Application Priority Data

Jan. 15, 2002 (JP) .............................. 2002-006564

(51) Int. Cl.
*H04L 9/00* (2006.01)
*G06F 21/00* (2006.01)

(52) U.S. Cl. ....................................... 713/193; 726/27
(58) Field of Classification Search ................. 713/193, 713/150, 176; 707/9; 711/100; 726/22, 726/25, 27, 31
See application file for complete search history.

(56) References Cited

U.S. PATENT DOCUMENTS

| | | | |
|---|---|---|---|
| 4,249,172 A * | 2/1981 | Watkins et al. ................. | 345/28 |
| 5,828,821 A | 10/1998 | Hoshina et al. | |
| 5,919,257 A * | 7/1999 | Trostle ......................... | 726/22 |
| 5,953,685 A * | 9/1999 | Bogin et al. .................. | 702/136 |
| 5,956,735 A | 9/1999 | Clark et al. | |
| 6,023,710 A | 2/2000 | Steiner et al. | |
| 6,034,832 A | 3/2000 | Ichimura et al. | |
| 6,078,338 A * | 6/2000 | Horan et al. .................. | 345/535 |
| 6,477,530 B1 * | 11/2002 | Omata et al. .................. | 707/9 |
| 6,732,124 B1 | 5/2004 | Koseki et al. | |

(Continued)

FOREIGN PATENT DOCUMENTS

EP 1 237 324 A1 9/2002

(Continued)

OTHER PUBLICATIONS

Office Action issued in Japanese Patent Application No. 2002-006564 mailed Aug. 26, 2008.

(Continued)

*Primary Examiner*—Gilberto Barron, Jr.
*Assistant Examiner*—Hadi Armouche
(74) *Attorney, Agent, or Firm*—Westerman, Hattori, Daniels & Adrian, LLP

(57) ABSTRACT

A log region of a memory card includes a plurality of log entries and a plurality of administration information storage units. Each of the plurality of log entries includes a license ID region, a Ks2w region, a status region and a KPcmy region. The status region includes a ST1 region and a ST2 region to store the communication status. The license ID region stores a license ID. The Ks2w region stores a session key. The KPcmy region stores a class public encryption key of a memory card. The administration information storage unit stores the last record sequence number corresponding to the log entry storing history information of the latest communication.

12 Claims, 19 Drawing Sheets

U.S. PATENT DOCUMENTS

| | | | |
|---|---|---|---|
| 6,789,203 B1 * | 9/2004 | Belissent | 726/22 |
| 6,898,708 B2 | 5/2005 | Hori et al. | |
| 6,952,737 B1 * | 10/2005 | Coates et al. | 709/229 |
| 6,999,948 B1 | 2/2006 | Hatanaka et al. | |
| 7,010,809 B2 | 3/2006 | Hori et al. | |
| 7,134,026 B2 | 11/2006 | Horiuchi et al. | |
| 7,181,629 B1 | 2/2007 | Hatanaka et al. | |
| 7,185,013 B2 * | 2/2007 | Burnett | 707/9 |
| 7,219,227 B2 | 5/2007 | Hori et al. | |
| 7,222,153 B2 | 5/2007 | Ando et al. | |
| 7,243,242 B2 | 7/2007 | Moriai | |
| 7,305,558 B1 | 12/2007 | Miyazaki et al. | |
| 7,340,055 B2 | 3/2008 | Hori et al. | |
| 2002/0034302 A1 | 3/2002 | Moriai et al. | |
| 2002/0131594 A1 | 9/2002 | Hori et al. | |
| 2002/0136405 A1 | 9/2002 | Hori | |
| 2002/0138442 A1 | 9/2002 | Hori et al. | |
| 2002/0138733 A1 | 9/2002 | Ishibashi et al. | |
| 2002/0176580 A1 | 11/2002 | Horiuchi et al. | |
| 2002/0183985 A1 | 12/2002 | Hori et al. | |
| 2002/0184154 A1 | 12/2002 | Hori et al. | |
| 2002/0184492 A1 | 12/2002 | Hori et al. | |
| 2002/0191764 A1 | 12/2002 | Hori et al. | |
| 2003/0009667 A1 | 1/2003 | Horiuchi et al. | |
| 2003/0116969 A1 | 6/2003 | Skinner et al. | |
| 2003/0161064 A1 | 8/2003 | Hori et al. | |
| 2003/0200458 A1 | 10/2003 | Hori et al. | |
| 2004/0010467 A1 | 1/2004 | Hori et al. | |
| 2004/0088510 A1 | 5/2004 | Hori | |
| 2004/0179691 A1 | 9/2004 | Hori et al. | |
| 2005/0076208 A1 | 4/2005 | Hori et al. | |
| 2005/0120232 A1 | 6/2005 | Hori et al. | |
| 2006/0116969 A1 | 6/2006 | Hatanaka et al. | |

FOREIGN PATENT DOCUMENTS

| | | | |
|---|---|---|---|
| JP | 03-231337 A | 10/1991 | |
| JP | 5-46359 A | 2/1993 | |
| JP | 6-202926 A | 7/1994 | |
| JP | 9-069082 A | 3/1997 | |
| JP | 9-74549 A | 3/1997 | |
| JP | 10-003745 A | 1/1998 | |
| JP | 10-240629 A | 9/1998 | |
| JP | 10-283229 A | 10/1998 | |
| JP | 11-39450 A | 2/1999 | |
| JP | 11-039450 A | 2/1999 | |
| JP | 11-120057 A | 4/1999 | |
| JP | 11-328982 A | 11/1999 | |
| JP | 2001-036523 A | 2/2001 | |
| JP | 2001-051889 A | 2/2001 | |
| JP | 2001-147864 A | 5/2001 | |
| JP | 2001-197292 A | 7/2001 | |
| JP | 2001-230768 A | 8/2001 | |
| JP | 2001-249836 A | 9/2001 | |
| JP | 2001-249855 A | 9/2001 | |
| JP | 2001-337600 A | 12/2001 | |
| JP | 2002-7263 A | 1/2002 | |
| JP | 2002-26890 A | 1/2002 | |
| JP | 2002-164881 A | 6/2002 | |
| JP | 2002-189648 A | 7/2002 | |
| JP | 2003-248557 A | 9/2003 | |
| WO | WO 00/08909 | 2/2000 | |
| WO | 01/41356 A1 | 6/2001 | |
| WO | WO 01/41356 A1 | 6/2001 | |
| WO | WO 01-69842 A1 | 9/2001 | |
| WO | WO 02/075550 A1 | 9/2002 | |

OTHER PUBLICATIONS

Japanese Office Action with English translation issued in corresponding Japanese Patent Application No. 2002-059179 mailed Mar. 6, 2007.

Decision to Grant Patent mailed on Sep. 8, 2009 of Japanese Patent Application No. 2002-216750.

* cited by examiner

FIG. 3

| LABEL | SYMBOL | ATTRIBUTE | CHARACTERISTICS |
|---|---|---|---|
| DATA | Dc | PECULIAR TO DATA | EXAMPLE: MUSIC DATA, STORY DATA, EDUCATIONAL DATA, IMAGE DATA ENCRYPTED DATA ENCRYPTED USING CONTENT KEY RECORDED AND ADMINISTERED AS E(Kc, Dc) |
| CONTENT KEY | Kc | PECULIAR TO DATA | COMMON KEY FOR ENCRYPTING/DECRYPTING ENCRYPTED DATA |
| DATA INFORMATION | Di | PECULIAR TO DATA | PLAINTEXT DATA ACCOMPANYING Dc. INCLUDING DID |
| DATA ID | DID | UNIQUE TO DATA | ADMINISTRATION CODE TO IDENTIFY DATA AND CONTENT KEY |
| LICENSE | LIC | PECULIAR TO DATA | GENERIC REPRESENTATION OF Kc//AC//DID/LID |
| LICENSE ID | LID | UNIQUE TO LICENSE | ADMINISTRATION CODE TO IDENTIFY LICENSE |
| CONTROL INFORMATION | AC | PECULIAR TO LICENSE | LIMITED EVENTS AS TO REPRODUCTION AND LICENSE HANDLING |

F I G. 4

| LABEL | SYMBOL | CHARACTERISTICS |
|---|---|---|
| MASTER KEY | Ka | SECRET ENCRYPTION KEY USED TO CREATE CLASS CERTIFICATE. USED AT CERTIFICATE AUTHORITY. |
| AUTHENTICATION KEY | KPa | PUBLIC DECRYPTION KEY TO VERIFY CERTIFICATE AT CERTIFICATE AUTHORITY. USED AT LICENSE PROVIDER SIDE |
| CLASS PUBLIC ENCRYPTION KEY | KPcxy | ENCRYPTION KEY ASSIGNED TO APPARATUS CLASS (FOR EVERY PREDETERMINED UNIT SUCH AS TYPE). x IS IDENTIFIER TO IDENTIFY APPARATUS. p FOR REPRODUCTION APPARATUS AND m FOR STORAGE APPARATUS. y IS IDENTIFIER TO IDENTIFY CLASS |
| CLASS PRIVATE DECRYPTION KEY | Kcxy | ASYMMETRIC DECRYPTION KEY TO DECRYPT DATA ENCRYPTED WITH CLASS PUBLIC ENCRYPTION KEY KPcxy |
| CLASS INFORMATION | Icxy | INFORMATION DATA RELATED TO APPARATUS PER CLASS AND CLASS PUBLIC ENCRYPTION KEY |
| CLASS CERTIFICATE | Cxy | KPcxy//Icxy//E(Ka, H(KPcxy//Icxy)) AUTHENTICATION CAN BE CONFIRMED BY AUTHENTICATION KEY |
| INDIVIDUAL PUBLIC ENCRYPTION KEY | KPomz | INDIVIDUAL PUBLIC ENCRYPTION KEY HAVING A VALUE FOR EACH STORAGE APPARATUS. z IS IDENTIFIER TO IDENTIFY STORAGE APPARATUS |
| INDIVIDUAL PRIVATE DECRYPTION KEY | Komz | ASYMMETRIC DECRYPTION KEY TO DECRYPT DATA ENCRYPTED WITH INDIVIDUAL PUBLIC ENCRYPTION KEY KPomz |
| SESSION KEY | Ks1w | TEMPORARY KEY GENERATED AT LICENSE TRANSMISSION SOURCE FOR EVERY LICENSE TRANSFER. SYMMETRIC KEY. w IS IDENTIFIER TO IDENTIFY GENERATION OF SESSION KEY |
| SESSION KEY | Ks2w | TEMPORARY KEY GENERATED AT LICENSE TRANSMISSION DESTINATION FOR EVERY LICENSE TRANSFER. SYMMETRIC KEY. w IS IDENTIFIER TO IDENTIFY GENERATION OF SESSION KEY |

F I G. 1 0
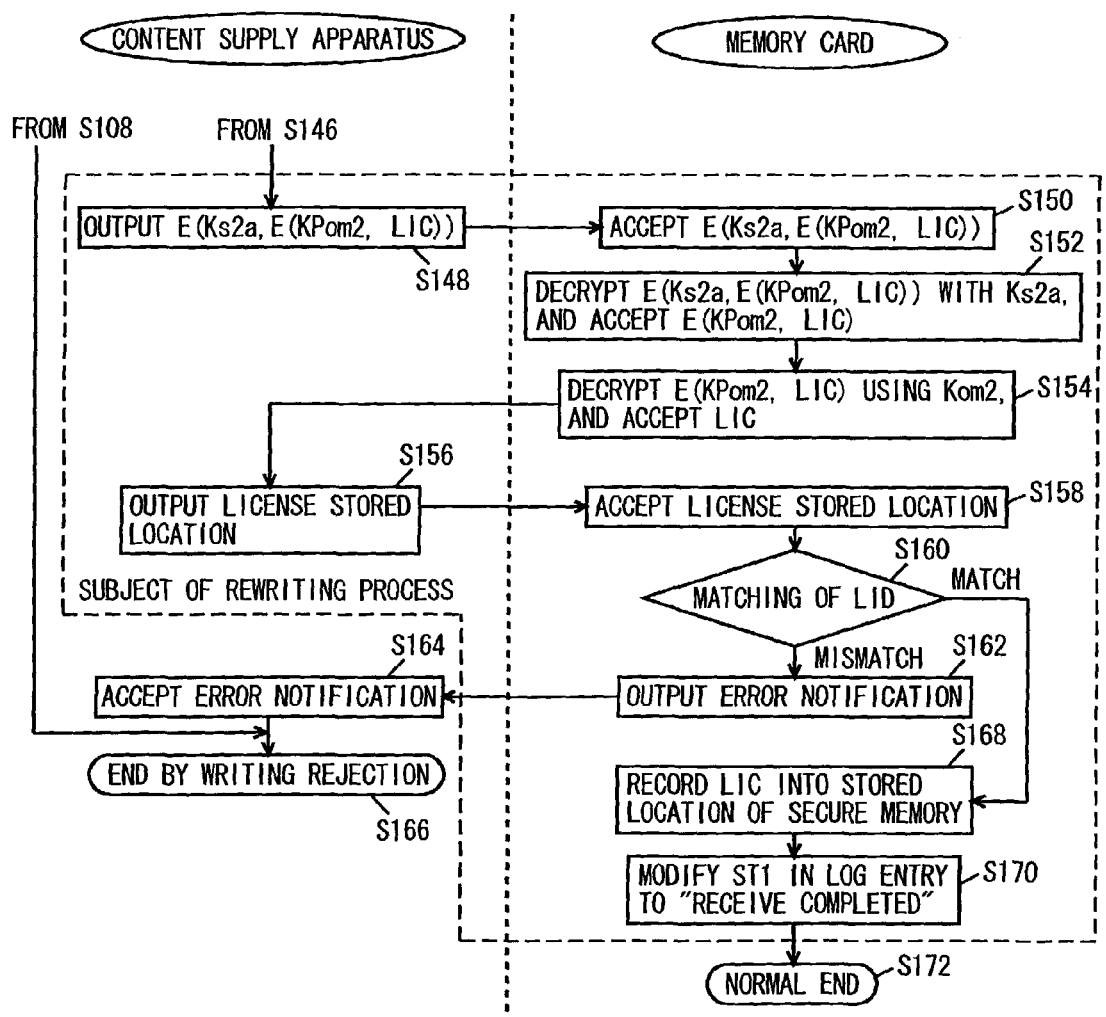

STORAGE APPARATUS THAT CAN PROPERLY RECOMMENCE INPUT AND OUTPUT OF CLASSIFIED DATA

BACKGROUND OF THE INVENTION

1. Field of the Invention

The present invention relates to a storage apparatus storing a license required to decrypt and reproduce encrypted data obtained using a data distribution system that allows copyright protection on copied information, particularly to a storage apparatus that allows copyright protection on information copied in a storage apparatus capable of multi-access.

2. Description of the Background Art

By virtue of the progress in digital information communication networks and the like such as the Internet in these few years, each user can now easily access network information through individual-oriented terminals employing a cellular phone or the like.

In such digital information communication networks, information is transmitted through digital signals. It is now possible to obtain copied music data and video data transmitted via the aforementioned information communication network without degradation in the audio quality and picture quality of the copied information, even in the case where the copying operation is performed by an individual user.

Thus, there is a possibility of the copyright of the copyright owner being significantly infringed unless some appropriate measures to protect copyrights are taken when contents subject to copyright protection such as music and image data are to be transmitted on the digital information communication network.

However, if copyright protection is given top priority so that distribution of content data through the disseminating digital information communication network is suppressed, the copyright owner who can essentially collect a predetermined copyright royalty for copies of a copyrighted data will also incur some disbenefit.

Sufficient measures must be taken in distributing content data such as music and image data to the public through the digital information communication network for the purpose of copyright protection since distribution per se is an act subject to restriction based on the copyright owner's right of transmission to the public.

In this state of affairs, it is necessary to prevent any unauthorized user from receiving content data transmitted to the public through a digital information communication network, as well as preventing any content data, once received by an authorized user, to be further copied without permission.

In view of the foregoing, a data distribution system is proposed in which a distribution server storing encrypted content data that is an encrypted version of content data distributes the encrypted content data via a terminal device such as cellular phone to a memory card loaded to the terminal device. In this data distribution system, a public encryption key of a memory card authenticated in advance by a certificate authority and a certificate thereof are transmitted to the distribution server when distribution of encrypted content data is requested. Upon confirming reception of the authorized certificate by the distribution server, the encrypted content data as well as the license required to decrypt the encrypted content data are transmitted to the memory card. The license includes a decryption key to decrypt encrypted content data (also called "content key" hereinafter), a license ID to identify the license, and control information to restrict usage of the license. When a license is to be transmitted from the distribution server to a memory card, the distribution server and memory card respectively generate session keys to exchange the keys between the distribution server and the memory card to establish an encryption communication path.

Eventually, the distribution server transmits the license to the memory card via the established encryption communication path. In the transmission process, the memory card stores the received encrypted content data and license in its internal memory.

When encrypted content data is to be reproduced, the memory card storing the encrypted content data and license is loaded to a terminal device that has a dedicated circuit. This dedicated circuit functions to read out the encrypted content data and content key from the memory card to decrypt and reproduce the encrypted content data for output to an external source. When a license key is to be read out, an encryption communication path is established between the memory card and the dedicated circuit to allow the license key to be transmitted to the dedicated circuit from the memory card via the encryption communication path.

The memory card is also capable of transferring or copying a license with respect to another memory card. In this case, the license is transferred from the source memory card to the destination memory card upon establishing an encryption communication path between the source memory card and the destination memory card, likewise the transmission of a license from a distribution server. Whether the license is to be transferred or copied depends upon the control information included in the license.

The memory card further has the capability to, when the license is lost due to accidental interruption during transmission/reception, recommence the process and record the latest history information associated with license input/output to prevent duplicated transmission, and output the recorded history information, if necessary. The distribution server or memory card that is the transmission source obtains the history information from the destination memory card to determine recommencement of the license transmission/reception according to the obtained history information. The history information includes a license ID and status information indicating reception/transmission.

The user of a terminal device can receive the encrypted content data and license from the distribution server through the communication network, store the received data in a memory card, and then reproduce the encrypted content data stored in the memory card or transfer the stored data to another memory card. Also, the rights of the copyright owner can be protected.

It is to be noted that a conventional memory card stores only the latest history information. In the case where transmission/reception with respect to another license is conducted after an event of communication interruption, the history information as to the previous interruption will be lost. On this occasion, the usability can be improved by storing a plurality of history information.

In accordance with the faster access speed of storage elements, it is expected that the need arises for conducting in parallel a plurality of inputs/outputs of licenses. In this case, there is the necessity to store a plurality of history information associated with respective input/output of license carried out in parallel.

When a license, once stored, is to be transferred to another memory card in the case where a plurality of history information can be stored, two different history information having a different status for the same license ID will be stored, resulting in the event of inconsistency in the stored history information. Thus, there is a possibility of the license being transferred to result in duplication, degrading the security.

SUMMARY OF THE INVENTION

In view of the foregoing, an object of the present invention is to provide a storage apparatus that can store without inconsistency a plurality of history information required for recommencement of input/output of interrupted license while ensuring uniqueness of the license.

According to an aspect of the present invention, a storage apparatus conducting input/output of classified data according to a predetermined procedure and storing the classified data includes an interface for data input/output with an external source, a data storage unit storing classified data, a plurality of log storage units storing history information associated with input/output of classified data, and a control unit controlling input/output of classified data. Each of the plurality of history information stored in the plurality of log storage units includes identification information to identify classified data. The control unit receives identification information via the interface to identify classified data that is the subject of input/output in response to commencement of a classified data input/output process, selects a log storage unit that stores history information including the received identification information out from the plurality of log storage units when there is such a log storage unit, and stores history information according to the progress of the procedure for classified data input/output into the selected log storage unit.

Preferably, each of the history information stored in respective plurality of log storage units further includes status information recording the progress status of classified data input/output. In the case where there is no log storage unit that stores history information including the received identification information in the plurality of log storage units, the control unit selects one of the plurality of log storage units that stores history information indicating that input of another classified data is completed according to the status information, and stores history information according to the progress of the procedure for classified data input/output to the selected log storage unit.

When there is no log storage unit that stores history information indicating that input of another classified data is completed according to the status information, the control unit preferably selects one of the plurality of log storage units that stores history information indicating an output waiting status of another classified data according to the status information, and stores history information according to the progress of the procedure for classified data input/output to the selected log storage unit.

Preferably, the storage apparatus further includes a log administration storage unit to administer the usage sequence of each of the plurality of log storage units. When there is no log storage unit that stores history information including the received identification information in the plurality of log storage units, the control unit selects a log storage unit determined as storing the oldest history information by the log administration storage unit from the plurality of log storage units, and stores history information according to the progress of the procedure for classified data input/output into the selected log storage unit.

Preferably, the storage apparatus further includes a log administration storage unit to administer the usage sequence of each of the plurality of log storage units. Each of the plurality of history information further includes input/output identification information to identify input/output of classified data, and status information recording the progress status of classified data input/output. When there is no log storage unit storing history information including the received identification information in the plurality of log storage units, the control unit selects a log storage unit storing history information of the lowest usage probability according to a predetermined procedure, and stores history information according to the progress of the procedure for classified data input/output into the selected log storage unit.

Preferably, the predetermined procedure includes the sequence of a log storage unit storing history information having status information indicating a status where classified data will not be lost, and a log storage unit storing history information determined as being the oldest by the log administration storage unit.

Preferably in the input procedure of receiving externally supplied classified data, the control unit stores, upon obtaining identification information of classified data that is the subject of input via the interface from an external source, the obtained identification information and input/output identification information identifying the input procedure into the selected log storage unit, modifies the status information stored in the selected log storage unit to an input waiting status, and upon obtaining classified data from an external source via the interface, modifies the status information stored in the selected log storage unit to an already input status.

Preferably, the storage apparatus further includes a temporary key generation unit generating a temporary key output to an external source via the interface to establish an encryption communication path to conduct input/output of classified data safely. In the input procedure, the control unit stores the temporary key generated by the temporary key generation unit in the selected log storage unit as the input/output identification information.

Preferably, the classified data includes identification data to identify the relevant classified data. In an input procedure, the control unit stores the input classified data in the data storage unit when the first identification information included in the history information stored in the selected log storage unit matches the second identification information included in the input classified data, and outputs an error notification via the interface when the first identification information does not match the second identification information.

Preferably, the control unit searches the plurality of log storage units for a log storage unit that stores history information including identification information matching externally applied identification information according to the identification information and a history information output request applied from an external source via the interface, and when there is a log storage unit storing history information including identification information that matches the externally applied identification information, outputs all or a portion of history information stored in that log storage unit for output via the interface.

Preferably, the storage apparatus further includes a signature value functional unit carrying out an operation of a signature value for data using a key obtained from an external source through the interface. The signature value functional unit carries out an operation of a signature value for all or a portion of history information and generates a signature value. The control unit provides all or a portion of the history information and the signature value for the history information to an external source via the interface.

Preferably, the storage apparatus further includes a log administration storage unit to administer the usage sequence of each of the plurality of log storage units. Each of the plurality of history information includes input/output identification information identifying the input/output of classified data, and status information recording the progress status of classified data input/output. When there is no log storage unit storing history information including the received identification information in the plurality of log storage units, the control unit selects a log storage unit storing history information having the lowest usage probability from the plurality of log storage units according to a predetermined procedure, and stores history information according to the progress of the procedure for input/output of classified data into the selected log storage data. In the output procedure to provide classified data to an external source, the control unit stores, upon obtaining identification information identifying classified data to be output and input/output identification information specifying output of classified data via the interface, the obtained identification information and input/output identification information into the selected log storage unit, modifies the status information stored in the selected log storage unit to an output waiting status, and upon providing classified data to an external source via the interface, modifying the status information stored in the selected log storage unit to an already input status.

In the output procedure, the control unit preferably obtains a temporary key via the interface from an external source to establish an encryption communication path to safely conduct input/output of classified data, and stores the obtained temporary key into the selected log storage unit as input/output identification information.

Preferably, the classified data includes identification information identifying the relevant classified data. In the output procedure, the control unit outputs history information stored in the data storage unit to an external source via the interface when the first identification information included in the history information stored in the selected log storage unit matches the second identification information included in the classified data stored in the data storage unit, and outputs an error notification via the interface when the first and second identification information do not match.

Preferably, the control unit searches, upon obtaining history information input from an external source via the interface, the plurality of log storage units for a log storage unit that stores history information including second identification information matching first identification information included in the history information input from an external source, and when there is such a log storage unit storing history information including the second identification information, determines whether to output classified data corresponding to the second identification information to an external source via the interface based on the history information stored in the log storage unit and the history information input from an external source.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 and 4 represent the characteristics of data, information and the like for communication in the data distribution system of FIG. 1.

FIGS. 9 and 10 are first and second flow charts, respectively, to describe a distribution operation in the data distribution system of FIG. 1.

DESCRIPTION OF THE PREFERRED EMBODIMENTS

Figure 1:
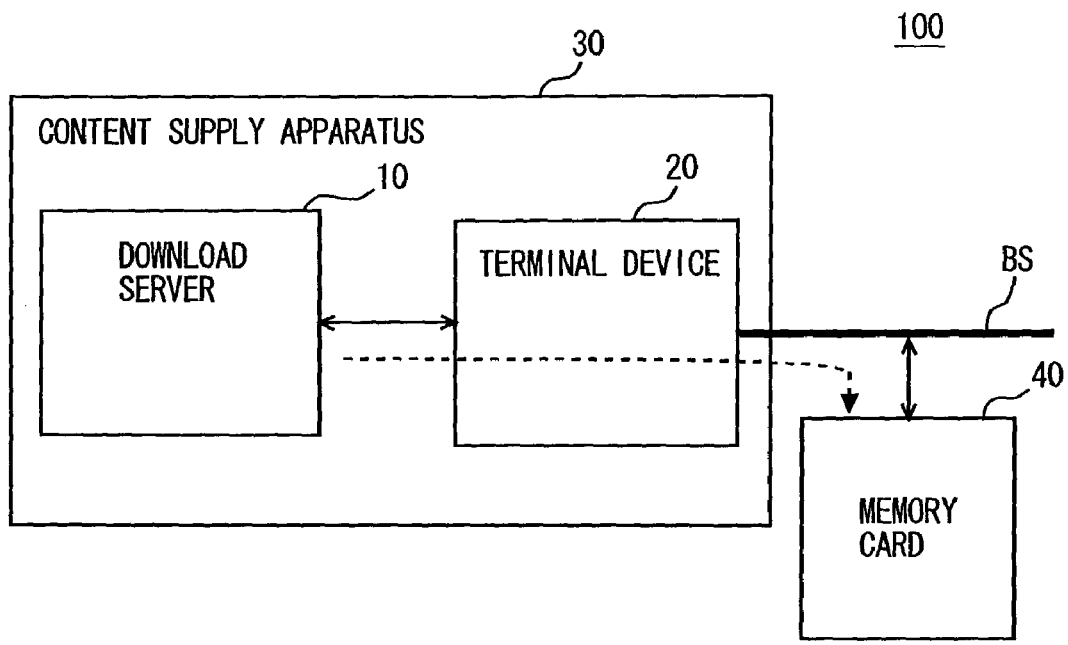
FIG. 1 is a schematic diagram to describe a data distribution system.

Embodiments of the present invention will be described with reference to the drawings. In the drawings, the same or corresponding components have the same reference characters allotted, and description thereof will not be repeated.

FIG. 1 is a schematic diagram to describe the entire structure of a data distribution system for a storage apparatus to obtain encrypted content data and a license required to decrypt the encrypted content data.

Description will be provided hereinafter based on example of a structure of a data distribution system in which music data is distributed to a memory card 40 loaded onto a user's terminal device (a cellular phone here) via a cellular phone network. However, the present invention is not limited to such a case, and is applicable to any application that distributes content data of other copyrights such as image data, motion picture data, and the like. Also, the communication network can be applied generally to a digital communication network. Furthermore, the storage apparatus is not limited to a memory card, and is applicable to a storage apparatus with a built-in controller such as a hard disk drive.

Referring to FIG. 1, a download server 10 receives a distribution request from a user of a terminal device (cellular phone) to which memory card 40 is loaded. Download server 10 administering music data determines whether memory card 40 loaded in terminal device 20 requesting access for data distribution has proper authentication data, i.e., performs an authentication process of whether the memory card is a proper card or not. Download server 10 encrypts the music data (also called "content data" hereinafter) according to a predetermined encryption method to protect the copyright for a proper memory card, and then distributes to terminal device 20 such encrypted content data as well as a license key directed to decrypt the encrypted content data as information required to reproduce encrypted content data.

In FIG. 1, terminal device 20 has a structure in which a detachable memory card 40 is loaded. Memory card 40 receives via a bus BS the encrypted content data and license received at terminal device 20 to record the same.

The user can use a headphone (not shown) or the like connected to terminal device 20 to "reproduce" such content data for audio reception.

Since terminal device 20 functions only to transfer the encrypted content data and license to memory card 40 via bus BS in the case where memory card 40 receives the encrypted content data and license from download server 10, download server 10 and terminal device 20 are generically referred to as content supply apparatus 30.

Memory card 40 loaded onto terminal device 20 can also transmit the encrypted content data and license received from download server 10 to another memory card.

Figure 2:
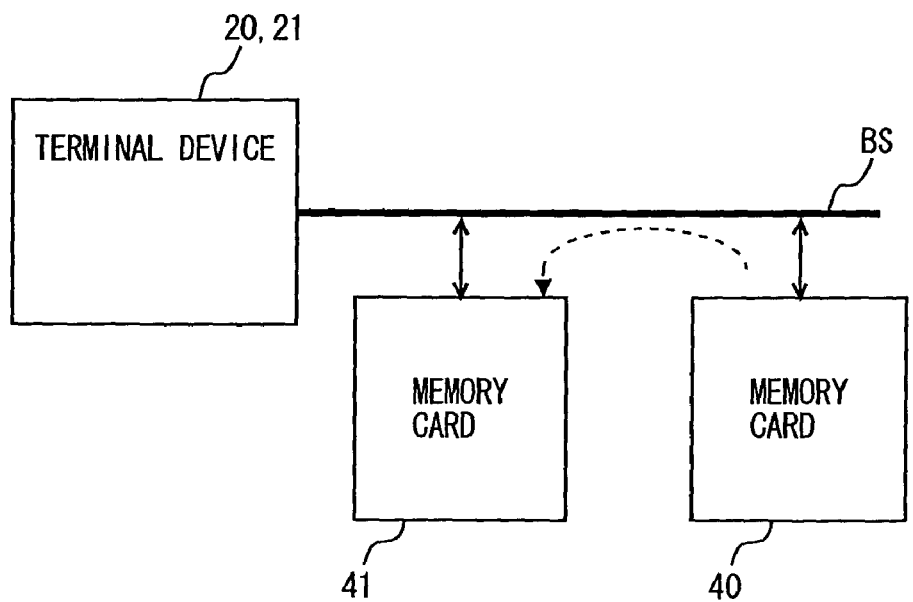
FIG. 2 is a schematic diagram to describe license transfer between memory cards obtaining the license of encrypted content data in the data distribution system of FIG. 1.

FIG. 2 shows a schematic diagram corresponding to the case where the encrypted content data and license are to be transmitted from memory card 40 to a memory card 41. In practice, memory card 40 is loaded onto terminal device 20 so that data is transferred through terminal device 20 via bus BS, whereas memory card 41 is loaded onto a terminal device 21 so that data is transferred through terminal device 21 via bus BS. When encrypted content data and a license are to be transmitted from memory card 40 to memory card 41, memory card 40 transmits the encrypted content data and license to terminal device 20 via bus BS, and terminal device 20 transmits the encrypted content data and license to terminal device 21 via radio. Terminal device 21 transmits the encrypted content data and license received from terminal device 20 to memory card 41 via bus BS.

Since terminal devices 20 and 21 function only to transfer the encrypted content data and license between memory cards 40 and 41 in the transmission of encrypted content data and license between memory card 40 and memory card 41, terminal devices 20 and 21 are indicated as one terminal device in FIG. 2.

Therefore, in the transmission process of encrypted content data and license from memory card 40 to memory card 41, memory card 40 transmits the encrypted content data and license to terminal devices 20 and 21 via bus BS, and terminal devices 20 and 21 transmit the encrypted content data and license data received from memory card 40 to memory card 41 via bus BS.

The same applies to the case where two memory cards 40 and 41 can be loaded onto one terminal device based on FIG. 2.

In the structure shown in FIG. 1, the system requirements to allow reproduction of encrypted and distributed content data with a terminal device include: (1) a scheme to distribute a license in communication; (2) a scheme per se to encrypt content data; and (3) a structure to realize protection to prevent illegal license copying.

The present embodiment will be described based on a structure that has the authentication and checking function with respect to the transfer destination of the license enhanced at respective processes of distribution, copy/transfer and reproduction, preventing leakage of a license key to improve copyright protection by suppressing output of content data to any storage apparatus (memory card) and terminal device (cellular phone or the like with content reproduction circuitry) that is not authorized.

In the following description, the process of transferring encrypted content data or a license thereof to a terminal device from download server 10 is referred to as "distribution".

FIG. 3 is a diagram to describe the characteristics of the data, information and the like used for communication in the data distribution system of FIG. 1.

First, data distributed by download server 10 will be described. Dc represents content data such as music data. Content data Dc is subjected to encryption that can be decrypted using a content key Kc. Encrypted content data E (Kc, Dc) subjected to encryption capable of decryption through content key Kc is distributed from download server 10 to the user of terminal device 20 in this form.

The representation of E (X, Y) implies that data Y has been encrypted using an encryption key X.

Together with the encrypted content data is distributed additional information Di as plaintext information associated with the content data. Additional data Di includes a data ID (DID) to identify content data Dc.

A license includes a content key Kc, a license ID (LID), a data ID (DID), control information AC, and the like.

Data ID is the code to identify content data Dc and content key Kc. License ID is the code to administer distribution of a license from download server 10 to identify each license. Control information AC is required to output the license or content key from a storage apparatus (memory card) to an external source, and includes the reproducible number of times (the output count of a license key for reproduction), control information associated with license transfer/copy, and the like.

The license ID, data ID, content key Kc and control information AC will be generically referred together as "license LIC" hereinafter.

For the sake of simplification, it is assumed that control information AC includes the two items of a reproduction count which is the control information to restrict the number of times of reproduction (0: reproduction disabled; 1 to 254: reproducible number of times; 255: no limitation), and a transfer/copy flag to restrict license transfer and copy (0: transfer and copy inhibited; 1: only transfer permitted; 2: transfer and copy permitted).

FIG. 4 is a diagram to describe the characteristics of the data and information for authentication employed in the data distribution system of FIG. 1.

The content reproduction circuit in terminal devices 20 and 21 as well as memory cards 40 and 41 are provided with a individual public encryption key YPcxy. Public encryption key KPcxy is assigned for every class of apparatus (a predetermined unit such as the type), wherein "x" is an identifier to identify a content reproduction circuit and storage apparatus. When the apparatus is a reproduction apparatus such as a content reproduction circuit, x=p is set. When the apparatus is a storage apparatus such as a memory card, x=m is set. "y" is an identifier to identify the apparatus class. Public encryption key KPcxy is decryptable by a private decryption key Kcxy. These public encryption key KPcxy and private decryption key Kcxy have a different value for every type such as a content reproduction circuit and memory card. These public encryption key and private decryption key are generically referred to as "class key". The public encryption key is called a class public encryption key, and the private decryption key is called a class private decryption key. The common unit sharing the same class key is referred to as "class". The class differs depending upon the fabrication organization, the type of product, the fabrication lot, and the like.

A class certificate Cxy is provided for a memory card and content reproduction circuit. The class certificate includes different information for each class of a content reproduction circuit and memory card.

Class certificate Cxy of a content reproduction circuit and memory card is recorded at the time of shipment in the content reproduction circuit and memory card in the form of KPcxy//Icxy//E (Ka, H (KPcxy//Icxy)). Icxy represents information data associated with each class of apparatus and class public encryption key KPcxy. H (X) implies a hash value of X. X//Y implies connection between X and Y. E (Ka, H (KPcxy//Icxy)) is the signature data of KPcxy//Icxy.

KPa is a public authentication key common to the entire data distribution system, and decrypts signature data corresponding to class public encryption key KPcxy and class information Icxy encrypted using a master key Ka at the certificate authority. Master key Ka is a private encryption key used to generate signature data of a class certificate at the certificate authority.

As keys to administer data processing in memory cards 40 and 41, a public encryption key KPomz set for each storage apparatus such as memory card 40 and memory card 41, and a individual private decryption key Komz that can be used to decrypt data encrypted with public encryption key KPomz are present. These public encryption key and private decryption key set for each memory card is generically referred to as "individual key". Public encryption key KPomz is called a individual public encryption key. Private decryption key Komz is called a individual private decryption key. "z" is an identifier to identify each storage apparatus.

Symmetric keys Ks1w and Ks2w generated at download server 10, terminal devices 20 and 21, and memory cards 40 and 41 for every license distribution, transfer, copy and reproduction are used.

These symmetric keys Ksw1 and Ks2w are unique symmetric keys generated for each "session" which is the communication unit or access unit among the download server, content reproduction circuit and memory card. These symmetric keys Ksw1 and Ks2w are also referred to as "session key" hereinafter.

Session keys Ksw1and Ks2w are under control of the download server, content reproduction circuit and storage apparatus (memory card) by having a value unique to each process. Specifically, session key Ksw1is generated at the data transmission source for each process. Session key Ks2w is generated at the data reception side for each process. By transferring these session keys at respective sessions to receive a session key generated at the other party apparatus for encryption, followed by transmission of a license key or the like, the security during a session can be enhanced.

Figure 5:
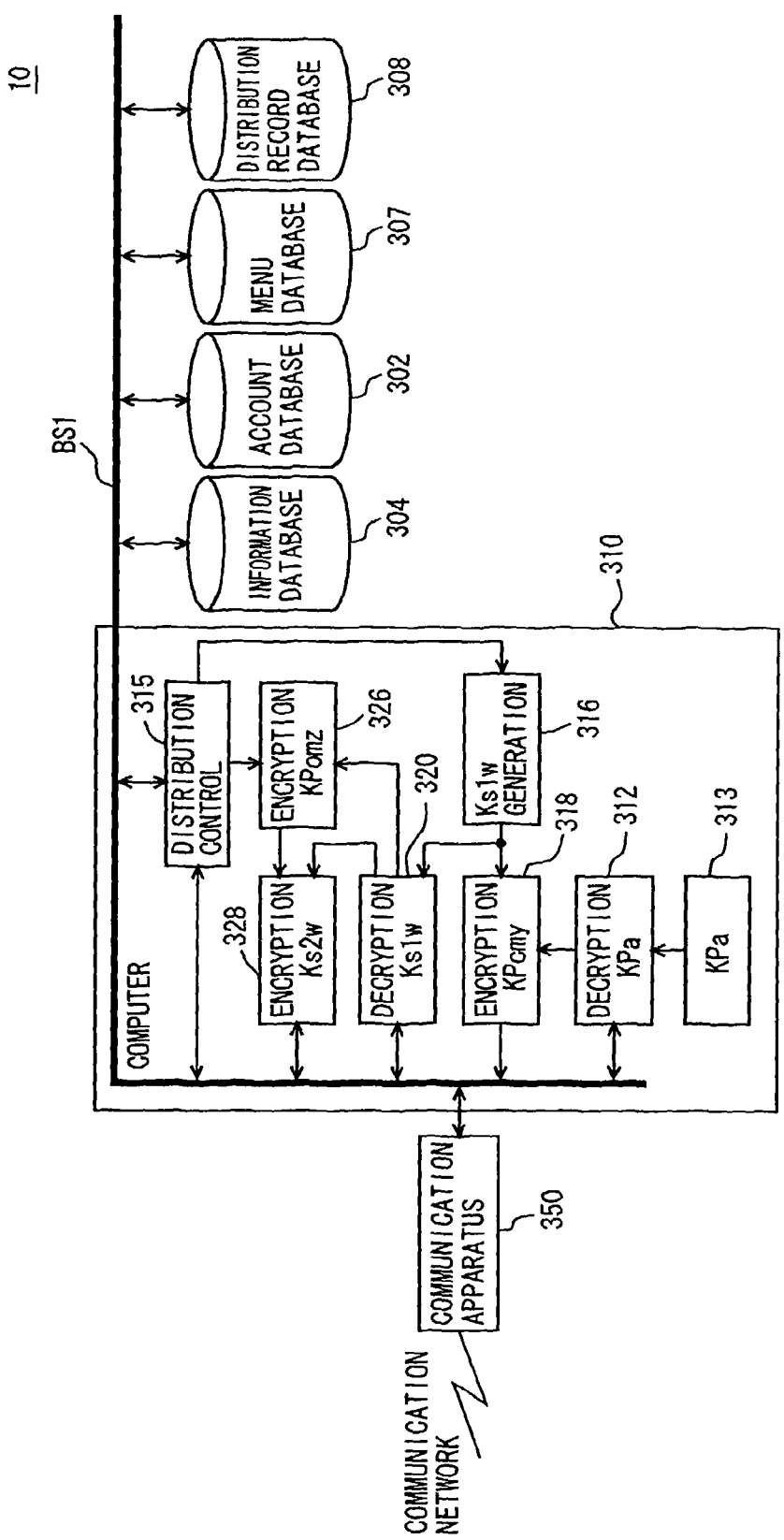
FIG. 5 is a schematic block diagram showing a structure of a download server of FIG. 1.

FIG. 5 is a schematic block diagram showing a structure of download server 10 of FIG. 1.

Download server 10 includes an information database 304 to store content data encrypted according to a predetermined method as well as distribution information such as a data ID, an account database 302 to store accounting information according to initiating access to content data for each terminal device user, a menu database 307 storing the menu of content data stored in information database 304, a distribution record database 308 generated for each license distribution to store a log associated with distribution such as a license ID to identify a license, a data processing unit 310 receiving via a bus BS1data from information database 304, account database 302, menu database 307 and distribution record database 308 to carry out the predetermined process, and a communication device 350 to transfer data between a distribution carrier and data processing unit 310 via a communication network.

Data processing unit 310 includes a distribution control unit 315 to control the operation of data processing unit 310 according to data on bus BS1, a session key generation unit 316 under control of distribution control unit 315 to generate a session key Ks1w in a distribution process, an authentication key hold unit 313 storing an authentication key KPa which is a public decryption key required to decrypt a class certificate Cxy=KPcxy/Icxy//E (Ka, H (KPcxy//Icxy)) transmitted from a memory card for authentication, a decryption processing unit 312 receiving class certificate Cxy from a memory card via communication device 350 and bus BS1to carry out a decryption process using authentication key KPa from authentication key hold unit 313, an encryption processing unit 318 encrypting session key Ks1w generated from session key generation unit 316 using a class public encryption key KPcxy obtained from decryption processing unit 312 to output the encrypted session key onto bus BS1, and a decryption processing unit 320 receiving from bus BS1the transmitted data encrypted by session key Ks1w to carry out a decryption process using session key Ks1w.

Data processing unit 310 further includes an encryption processing unit 326 to encrypt content key Kc and control information AC applied from distribution control unit 315 using a individual public encryption key KPomz of a memory card obtained by decryption processing unit 320, and an encryption processing unit 328 further encrypting the output of encryption processing unit 326 using a session key Ks2w applied from decryption processing unit 320 to output the further encrypted data onto bus BS1.

The operation of download server 10 in a distribution process will be described in further detail afterwards with reference to flow charts.

Figure 6:
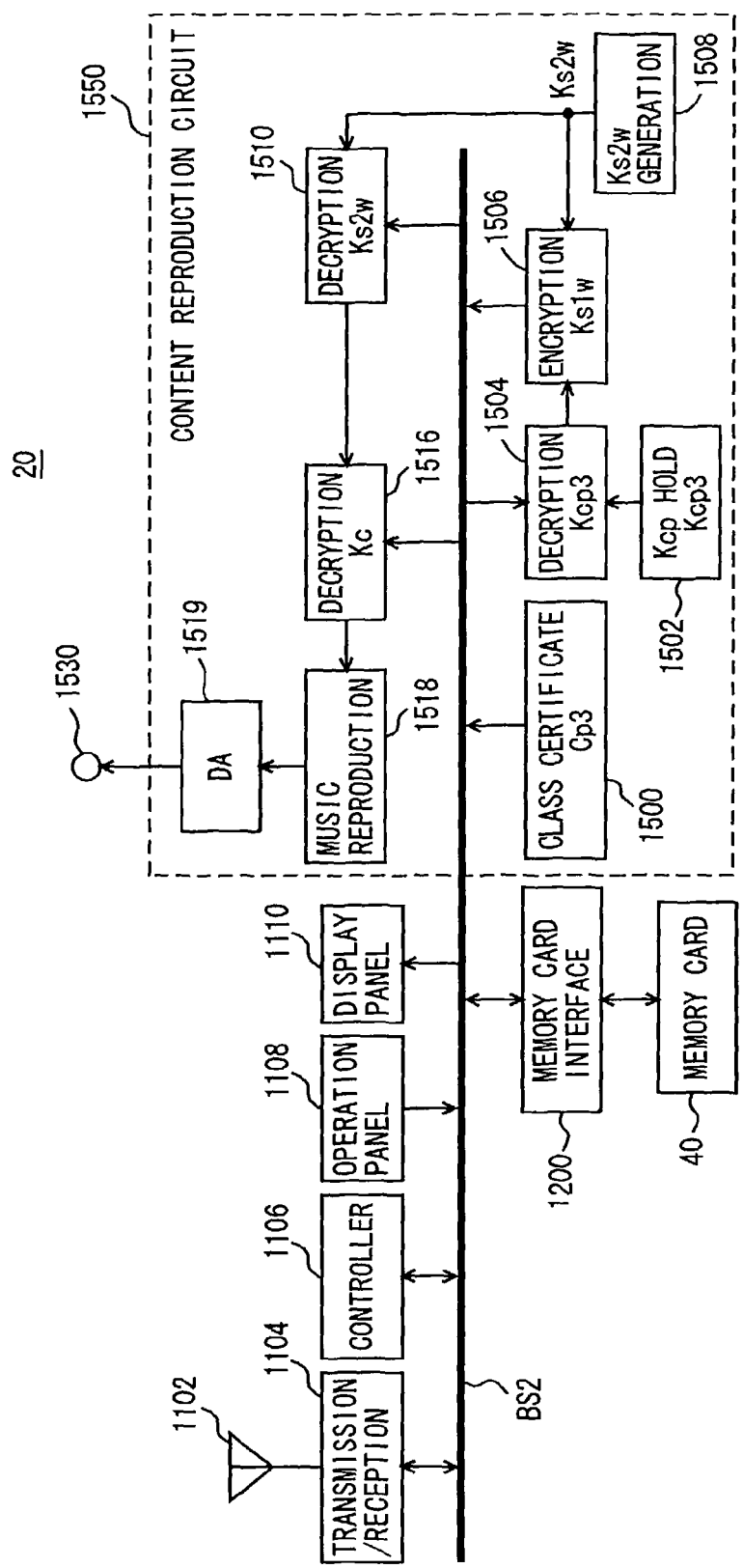
FIG. 6 is a schematic block diagram of a structure of a terminal device in FIG. 1.

FIG. 6 is a schematic block diagram to describe a structure of terminal device 20 including the content reproduction circuit of FIG. 1.

Terminal device 20 includes an antenna 1102 receiving signals transmitted through radio, a transmitter/receiver unit 1104 converting received signals from antenna 1102 into baseband signals, or modulating and providing to antenna 1102 data from terminal device 20, a bus BS2to transfer data among the components in terminal device 20, a controller 1106 to control the operation of terminal device 20 via bus BS2, an operation panel 1108 to apply designation from an external source to terminal device 20, and a display panel 1110 to provide information output from controller 1106 and the like as visual information to the user.

Terminal device 20 further includes a detachable memory card 40 storing content data (music data) from download server 10, and applying a decryption process, and a memory card interface 1200 to control data transfer between memory card 40 and bus BS2, and a content reproduction circuit 1550.

Content reproduction circuit 1550 includes a certificate hold unit 1500 to store class certificate Cp3=KPcp3//Icp3//E (Ka, H (KPcp3//Icp3)). It is assumed that the class y of terminal device 20 is y=3 here.

Terminal device 20 further includes a Kcp hold unit 1502 storing a decryption key Kcp3 unique to each class, and a decryption processing unit 1504 decrypting the data received from bus BS2 using decryption key Kcp3to obtain session key Ks1w generated by memory card 40.

Terminal device 20 further includes a session key generation unit 1508 generating by a random number or the like a session key Ks2w required to encrypt data transferred to/from memory card 40 via bus BS2 in a reproduction process to reproduce content data stored in memory card 40, and an encryption processing unit 1506 encrypting session key Ks2w generated by session key generation unit 1508 using session key Ks1w of memory card 40 obtained by decryption processing unit 1504 during the reception operation of content key Kc and reproduction control information from memory card 40 in a reproduction process of encrypted content data, and providing the encrypted session key onto bus BS2.

Terminal device 20 further includes a decryption processing unit 1510 decrypting the data on bus BS2 using session key Ks2w to output a content key Kc, and a decryption processing unit 1516 receiving encrypted content data E (Kc, Dc)

from bus BS2 to decrypt encrypted content data E (Kc, Dc) using content key Kc from decryption processing unit 1510 to output content data Dc to a music reproduction unit 1518.

Terminal device 20 further includes a music reproduction unit 1518 receiving the output from decryption processing unit 1516 to reproduce content data Dc, a DA converter 1519 to convert the output of music reproduction unit 1518 into an analog signal from a digital signal, and a terminal 1503 to provide the output of DA converter 1519 to an external output apparatus (not shown) such as a headphone.

The operation of each component of terminal device 20 in respective sessions will be described in detail afterwards with reference to flow charts.

Figure 7:
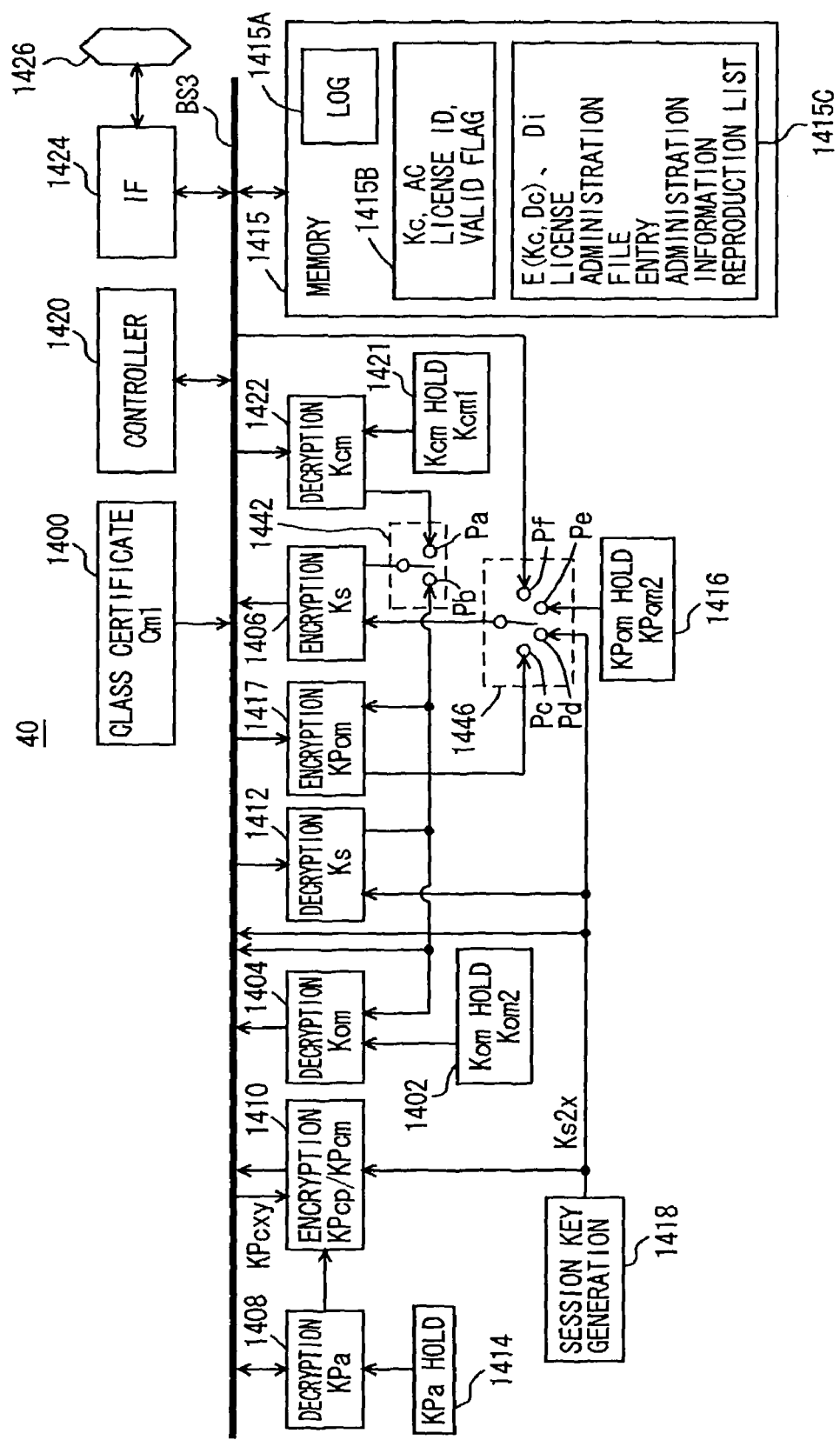
FIG. 7 is a block diagram showing a structure of a memory card in FIG. 1.

FIG. 7 is a schematic block diagram to describe a structure of memory card 40 of FIG. 1.

As previously described, class public encryption key KPcmy and class secret description key Kcmy are respectively provided for memory card 40, and a class certificate Cmy=KPcmy//Icmy//E (Ka, H (KPcmy//Icmy)) is provided for a memory card. It is assumed that, in memory card 40, class identifier y=1 is employed. Also, the unique identifier "z" identifying a memory card is represented as z=2.

Accordingly, memory card 40 includes a certificate hold unit 1400 storing class certificate Cm1=KPcm1//Icm1//E (Ka, H (KPcm1/Icm1)), a Kom hold unit 1402 storing a individual private decryption key Kom2 that is a unique decryption key set for each memory card, a Kcm hold unit 1421 storing a class private decryption key Kcm1, and a KPom hold unit 1416 storing a public encryption key Kpom2 that is decryptable by individual private decryption key Kom2.

By providing an encryption key of a storage apparatus such as a memory card, administration of the distributed content data and encrypted license key can be executed per memory card unit, as will be apparent in the following description.

Memory card 40 further includes an interface 1424 to transfer data via a terminal 1426 to/from memory card interface 1200, a bus BS3 that transfers a signal to/from interface 1424, a decryption processing unit 1422 decrypting the data applied onto bus BS3 from interface 1424 using a class private decryption key Kcm1 from Kcm hold unit 1421, a decryption processing unit 1408 receiving an authentication key KPa from KPa hold unit 1414 to execute a decryption process on signature data E (Ka; H (KPcxy//Icxy)) of a class certificate of another apparatus applied on bus BS3 and output the decrypted result to controller 1420, and an encryption processing unit 1406 encrypting the data selectively applied by a switch 1446 using a session key selectively applied by a switch 1442 from another apparatus, and providing the encrypted data onto bus BS3.

Memory card 40 further includes a session key generation unit 1418 generating session keys Ks1w and Ks2w at respective sessions of distribution, copy/transfer and reproduction, an encryption processing unit 1410 encrypting session key Ks1w output from session key generation unit 1418 using a class public encryption key KPcpz or KPcmz of another apparatus and providing the encrypted key onto bus BS3, a decryption processing unit 1412 receiving encrypted data from bus BS3 to decrypt the received data using session keys Ks1w and Ks2w obtained from session key generation unit 1418, and an encryption processing unit 1417 encrypting content key Kc read out from memory 1415 using a individual public encryption key KPomz (z≠2) of another memory card when functioning as the license transmission source in a transfer/copy process.

Memory card 40 further includes a decryption processing unit 1404 decrypting data encrypted with individual public encryption key Kpom2 on bus BS3 using individual private decryption key Kom2 of memory card 40, and a memory 1415 receiving through bus BS3 for storage a log to store history of communication with download server 10 or other memory cards, encrypted content data E (Kc, Dc), a license (Kc, AC, license ID, data ID) required to reproduce encrypted content data E (Kc, Dc), additional information Di, a reproduction list of encrypted content data, and a license administration file to administer the license.

Memory 1415 includes a log region 1415A, a license region 1415B and a data region 1415C. Log region 1415A is a region for log recording. The detail of log region 1415A will be described afterwards.

License region 1415B is a region to record licenses. License region 1415B stores a license (content key Kc, control information AC, license ID, data ID) and a valid flag per unit of recording exclusively for a license called "entry" to record a license and valid flag. Access to a license is obtained by specifying the stored location of the entry where a license is stored or where a license is to be recorded.

In the transfer/copy operation of a license from a storage apparatus (memory card) of the transmitter side to a storage apparatus of the receiver side in the present embodiment, a valid flag indicating whether the license stored in the storage apparatus of the transmission source is valid/invalid is employed. When this valid flag indicates a valid state, the license can be output from the memory. When the valid flag indicates an invalid state, the license cannot be output from the memory.

Data region 1415C is the region to record encrypted content data E (Kc, Dc), additional information Di of encrypted content data E (Kc, Dc), a license administration file to record information required for license administration for every encrypted content data, a reproduction list recording basic information required to access encrypted content data E (Kc, Dc) and license recorded in a memory card, and entry information to administer entry of license region 1415B. Data region 1415C can be directly accessed by an external source. The details of the license administration file and reproduction list will be described afterwards.

Memory card 40 further includes a controller 1420 to transfer data with an external source via bus BS3, receive control information AC through bus BS3, and control the operation of memory card 40.

The entire structure besides data region 1415C is formed in a tamper-resistant module region.

Figure 8:
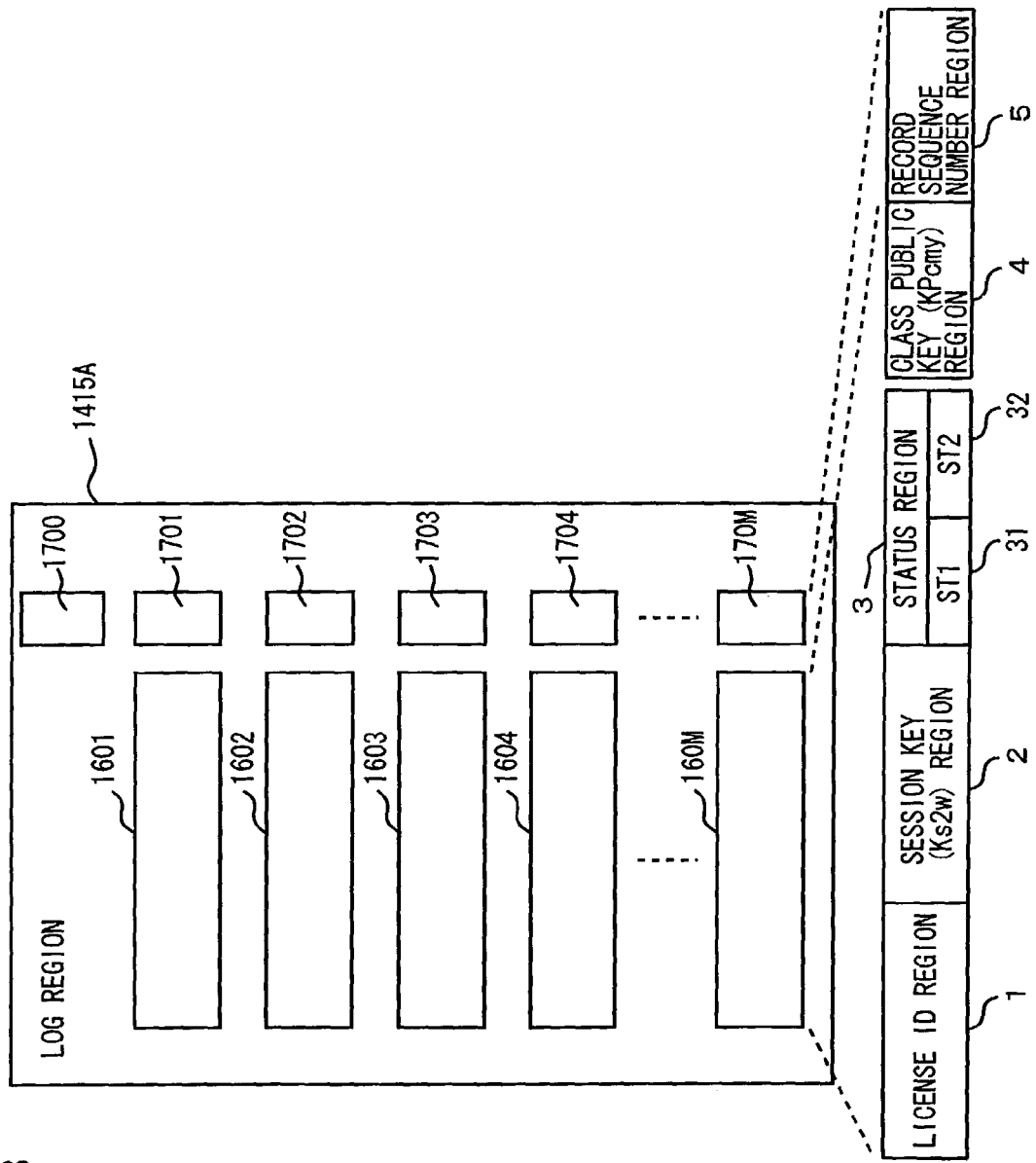
FIG. 8 is a block diagram showing a structure of a log region in FIG. 7.

FIG. 8 is a diagram to describe in detail log region 1415A in memory 1415 included in memory card 40. Referring to FIG. 8, log region 1415A includes M log entries 1601-160M (M is a natural number) storing history information, and M+1 administration information storage units 1700-170M. Log entries 1601-160M are storage units to store one history information of each communication in the process of memory card 40 transmitting/receiving a license to/from download server 10 or another memory card. Administration information storage units 1701-170M are provided in a one-to-one-correspondence with log entries 1601-160M, storing a record sequence number indicating the usage sequence of the log entry. Administration information storage unit 1700 stores the record sequence number assigned to the log entry that stores the latest updated history information (referred to as "last record sequence number" hereinafter). The record sequence number is a natural number of N bits. The record sequence number is an administration number sequentially incremented by one with respect to a used log entry for assignment. The record sequence number is calculated in the residue system of the Nth power of 2.

For example, when record sequence number "101" is assigned at the update of the history information in log entry 1602, record sequence number "101" is stored in administration information storage unit 1702 corresponding to log entry 1602 and administration information storage unit 1700 that stores the last record sequence number. Then, when the history information of log entry 1604 is updated, administration information storage unit 1700 is referred to, to obtain the last record sequence number "101". 1 is added to record sequence number "101". This resultant record sequence number of "102" is assigned to the history information of log entry 1604. Administration information storage unit 1704 corresponding to log entry 1604 and administration information storage unit 1700 will store "102" as the last record sequence number. Eventually, the log entry storing the oldest history information can be identified by comparing the last record sequence number stored in administration information storage unit 1700 and the appropriately-altered record sequence number stored in administration information storage units 1701-170M corresponding to each log entry.

Each of log entries 1601-160M includes a license ID region 1, a Ks2w region 2, a status region 3, and a KPcmy region 4. License ID region 1 stores a license ID of a license that is the subject of transmission/reception in the transfer/copy process. Ks2w region 2 stores a session key Ks2w generated at the receiver memory card in the communication of transmitting/receiving a license. Status region 3 is formed of a ST1 region 31 and a ST2 region 32. ST1 region 31 stores the record of any of "receive prepared", "receive completed", "send prepared" and "send completed". ST2 region 32 stores the record of any of "data not exist" "data valid" and "data invalid". In other words, ST1 region 31 represents the final communication status in the communication of license transmission/reception, whereas ST2 region 32 represents whether the license has been actually transmitted/received or not.

KPcmy region 4 stores a class public encryption key KPcmy of the transmission side in the license copy/transfer process between memory cards.

Log entries 1601-160M correspond to a finite number of history information, wherein M which is the count of history information and N which is the bit number of the record sequence number stored in each of administration information storage units 1701-170M are selected so that the relationship of $2^N-1 \gg M$ is established.

The operation of respective processes in the data distribution system of FIG. 1 will be described hereinafter.

[Distribution]

First, the operation of distributing from download server 10 to memory card 40 of terminal device 20 a license in the data distribution system of FIG. 1 required to decrypt the encrypted content data will be described.

Figure 9:
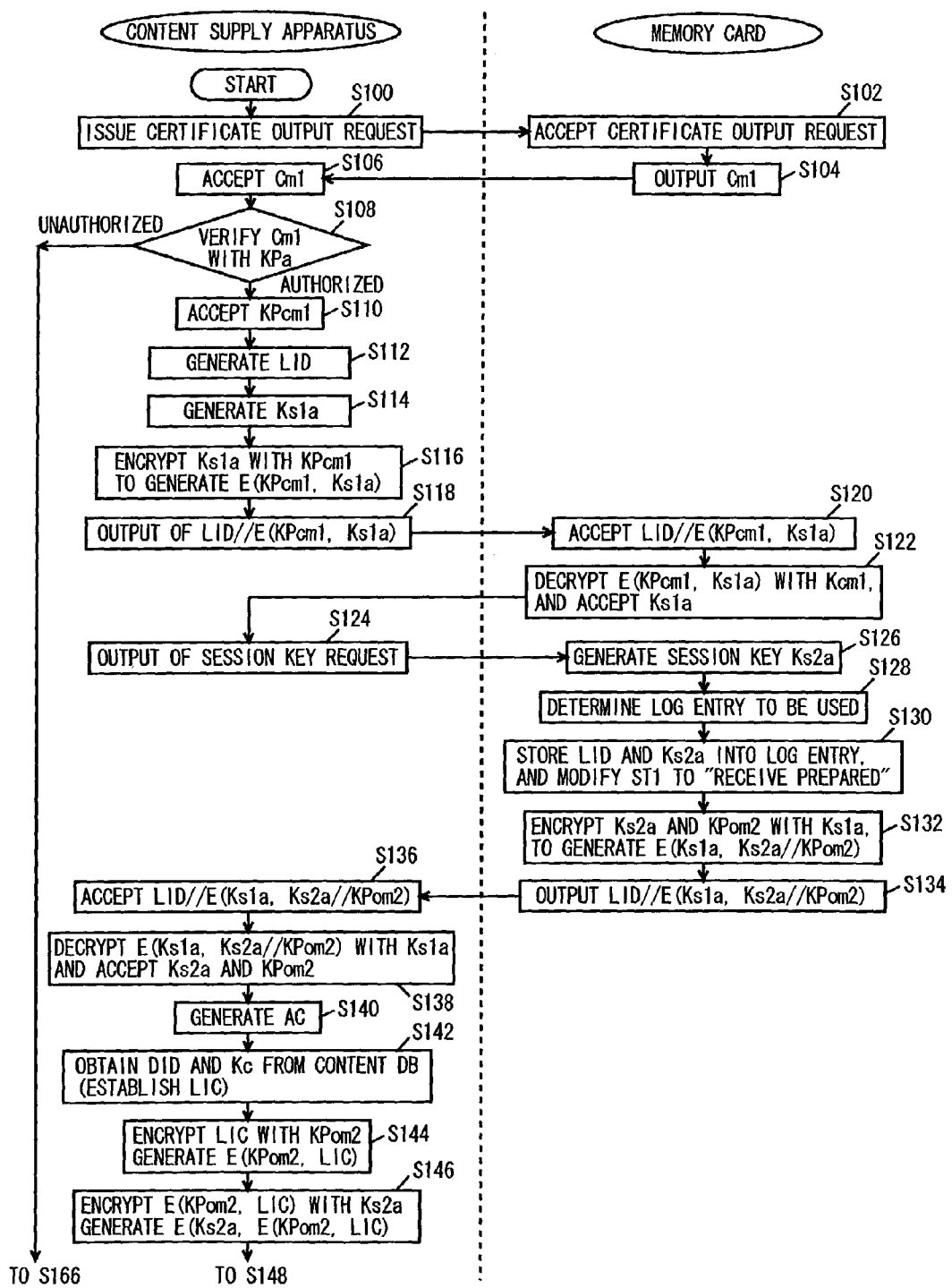

FIGS. 9 and 10 are the first and second flow charts, respectively, to describe a license distribution process to memory card 40 loaded onto terminal device 20 in the license download operation in the data distribution system of FIG. 1.

It is assumed that, prior to the process of FIG. 9, the user of terminal 20 has established communication with download server 10 via a telephone network, obtained a data ID of the content that is to be downloaded, issued a distribution request towards download server 10, and obtained the entry administration information of memory card 40 to confirm that there is an empty entry in license region 1415B.

Referring to FIG. 9, a license reception process is designated by the user of terminal device 20 via operation panel 1108.

Upon designation of a license reception process, controller 1106 issues a class certificate output request to memory card 40 via bus BS2 and memory card interface 1200 (step S100). Controller 1420 of memory card 40 receives the class certificate output request via terminal 1426, interface 1424 and bus BS3 (step S102). Then, controller 1420 reads out class certificate Cm1 from certificate hold unit 1400 via bus BS3. Class certificate Cm1 is output via bus BS3, interface 1424 and terminal 1426 (step S104).

Controller 1106 of terminal device 20 transmits class certificate Cm1 from memory card 40 towards download server 10. Download server 10 receives class certificate Cm1 from terminal device 20 (step S106). Decryption processing unit 312 decrypts signature data E (Ka, H (KPcm1//lcm1), of class certificate Cm1=KPcm1//1cm1//E (Ka, H (KPcm1//lcm1)) output from memory card 40 using authentication key KPa, and provides hash value H (KPcm1//lcm1) which is the decrypted data thereof to distribution control unit 315. Distribution control unit 315 carries out an operation of the hash value of KPcm1//lcm1 of class certificate Cm1, and confirms whether the operated hash value matches hash value H (KPcm1//lcm1)) received from decryption processing unit 312. Thus, authentication of class certificate Cm1 is conducted (step S108). Determination is made that class certificate Cm1 is a proper one when the two hash values match each other.

When determination is made of a proper class certificate as a result of authentication by distribution control unit 315, control proceeds to the next process (step S110). When the class certificate is not a proper one, distribution control unit 315 sets an unauthorized state, and the distribution process ends without accepting class public encryption key KPcm1 (step S166).

Upon confirmation of access from a terminal device loaded with a memory card that has a proper class certificate as a result of authentication at download server 10, distribution control unit 315 in download server 10 accepts class public encryption key KPcm1 included in class certificate Cm1 of memory card 40 (step S110). A license ID to identify the license that is to be distributed is generated (step S112).

Session key generation unit 316 generates a session key Ks1a for distribution (step S114). Session key Ks1a is encrypted at encryption processing unit 318 by class public encryption key KPcm1 of memory card 40 (step S116).

Distribution control unit 315 transmits the license ID and encrypted session key Ks1a as license ID//E (KPcm1, Ks1a) to terminal device 20 via bus BS1 and communication device 350.

Upon receiving license ID//E (KPcm1, Ks1a), controller 1106 of terminal device 20 applies license ID//E (KPcm1, Ks1a) to memory card 40 (step S118). Controller 1420 of memory card 40 accepts license ID//E (KPcm1, Ks1a) via terminal 1426 and interface 1424 (step S120). Controller 1420 provides encrypted data E (KPcm1, Ks1a) to decryption processing unit 1422 via bus BS3. Decryption processing unit 1422 decrypts encrypted data E (KPcm1, Ks1a) using class private decryption key Kcm1 that is unique to memory card 40, stored in Kcm hold unit 1421, and accepts session key Ks1a (step S122).

Then, controller 1106 of terminal device 20 issues an output request of the session key to memory card 40 via memory card interface 1200 (step S124). Controller 1420 of memory card 40 receives the session key output request via terminal 1426 and interface 1424, and controls session key generation unit 1408 so as to generate a session key. In response, session key generation unit 1418 generates session key Ks2a (step S126). Controller 1420 selects from a plurality of log entries 1601-160M in log region 1415A a log entry 160$i$ ($1 \leq i \leq M$) that stores history information to record a license reception communication from download server 10 according to a predetermined sequence (S128).

The method of employing a log entry to record the license reception communication from download server 10 will be described with reference to FIG. 11. Upon initiation of the operation, controller 1420 searches log entries 1601-160M for a log entry whose history information includes a license ID identical to the license ID (LID) that is to be received from download server 10 (step S1281). When a log entry that stores history information including a license ID identical to the license ID (LID) that is to be received from download server 10 is detected, control proceeds to step S1285. When a log entry that stores history information including a license ID identical to the license ID (LID) is not detected at step S1281, a search is conducted for a log entry that stores history information having "receive completed" recorded in ST1 region 31 of status region 3 (step S1282). When such a log entry is detected, control proceeds to step S1285. When such a log entry is not found at step S1282, a search is conducted for a log entry that stores history information having "send prepared" recorded in ST1 region 31 of status region 3 (step S1283). When such a log entry is detected, control proceeds to step S1285. When such a log entry is not detected, the last record sequence number stored in administration information storage unit 1700 is compared with each record sequence number stored in the M administration information storage units 1701-170M to identify the administration information storage unit that has a record sequence number with the greatest difference recorded. The log entry corresponding to that identified administration information storage unit is detected. In other words, the log entry having the oldest history information recorded is detected (step S1284).

Then, controller 1420 employs a log entry 160$i$ ($1 \leq i \leq M$) detected at any of steps S1281-S1284 (step S1285). The last record sequence number stored in administration information storage unit 1700 is incremented by 1 (step S1286). Controller 1420 modifies the record sequence number stored in administration information storage unit 170$i$ corresponding to the employed log entry 160$i$ to the last record sequence number stored in administration information storage unit 1700 (step S1287). Accordingly, the log entry select operation ends.

Figure 11:
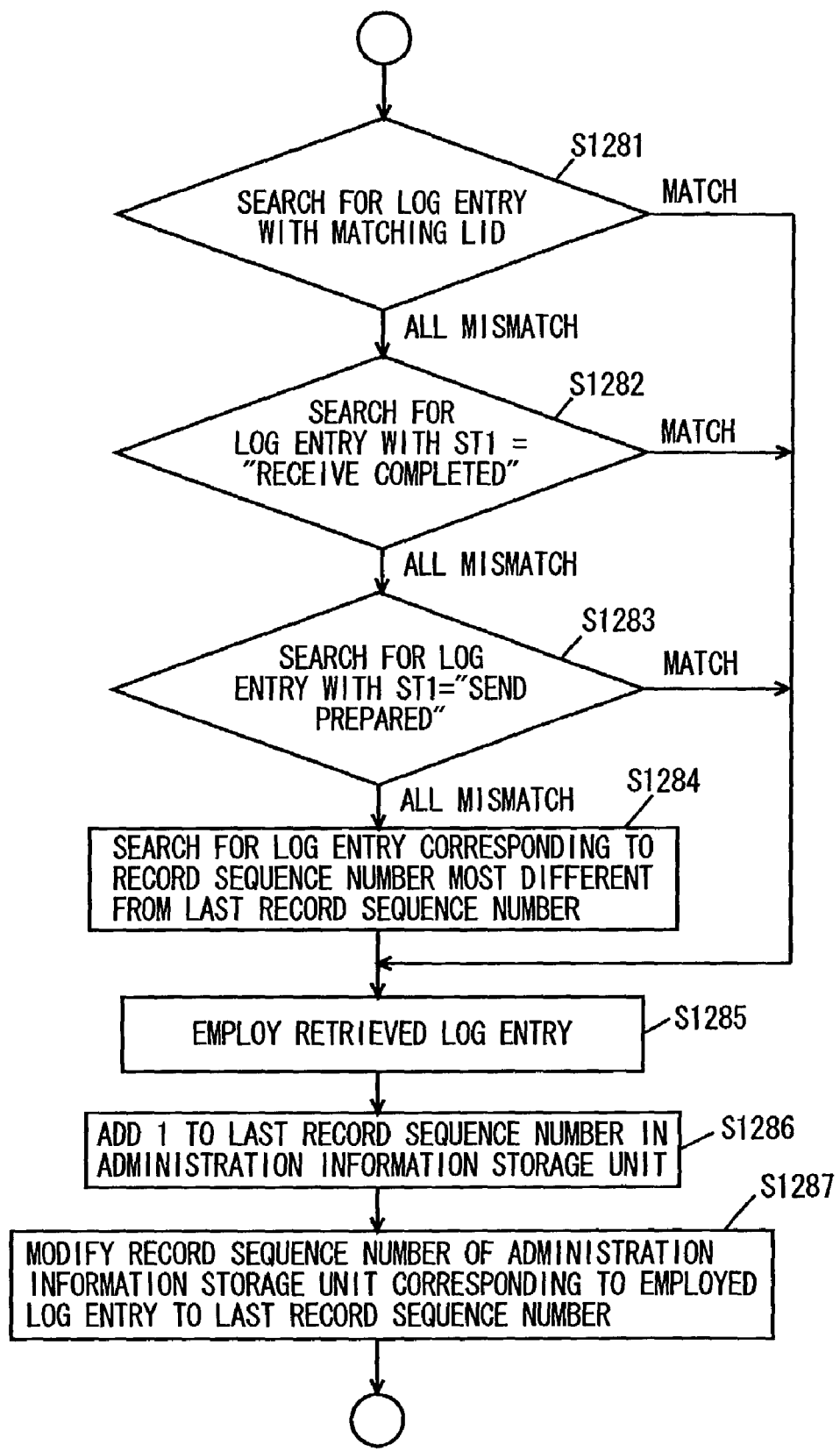
FIG. 11 is a flow chart to describe in detail the operation of step S128 of FIG. 9.

In the select method of FIG. 11, one log entry 160$i$ is selected from log entries 1601-160M in the order of a log entry including the license ID of the license that is the subject of communication in the history information stored in log entries 1601-160M, a log entry recorded with "receive completed" in ST1 region 31 of the stored history information, a log entry recorded with "send prepared" in ST1 region 31 of the stored history information, and a log entry storing history information that has been least recently updated.

The log entry including the license ID of the license that is the subject of communication in the history information corresponding to the first condition is the selection criterion to avoid recording of duplicated history information with respect to one license. The log entry recorded with "receive completed" in ST1 region 31 of the stored history information corresponding to the second condition, and the log entry recorded with "send prepared" in ST1 region corresponding to the third condition are the selection criteria to select a log entry that does not pose any problem even if updated in a state where a license retransmission process does not have to be conducted. In other words "receive completed" implies that the license is already recorded in license region 1415B of memory 1415 at the memory card of the transmission destination. "Send prepared" implies that the license is not output from the memory card of the transmission source (license is stored in license region 1415B of memory 1415). The log entry storing history information with the least recent update corresponding to the fourth condition is the selection criterion to select a log entry expected to have the lowest probability of retransmission.

After step S128 of FIG. 9, controller 1420 stores the received license ID and generated key Ks2$a$ in license ID region 1 and Ks2$w$ region 2, respectively, of log entry 160$i$ employed at step S128, and modifies ST1 region 31 of status region 3 to "receive prepared" (step S130).

Encryption processing unit 1406 uses session key Ks1$a$ applied from decryption processing unit 1422 via a contact Pa of switch 1442 to encrypt session key Ks2$a$ applied by switching the contact of switch 1446 and individual public encryption key Kpom2 as one data train to output encrypted data E (Ks1$a$, Ks2$a$//Kpom2) onto bus BS3 (step S132). Controller 1420 outputs data LID//E (Ks1$a$, Ks2$a$//Kpom2) which is encrypted data E (KS1$a$, Ks2$a$//Kpom2) output on bus BS3 added with a license ID (LID) to terminal device 20 via bus BS3, interface 1424 and terminal 1426 (step S134). Terminal device 20 transmits data LID//E (Ks1$a$, Ks2$a$//Kpom2) to download server 10.

Download server 10 receives data LID//E (Ks1$a$, Ks2$a$//KPom2) (step S136). Decryption processing unit 320 decrypts encrypted data LID//E (Ks1$a$, Ks2$a$//Kpom 2) using session key Ks1$a$, and accepts session key Ks2$a$ generated at memory card 40 and individual public encryption key Kpom2 of memory card 40 (step S138).

Distribution control unit 315 generates control information AC (step S140), and obtains a data ID and content key Kc from information database 304 (step S142).

Distribution control unit 315 provides the license ID, data ID, content key Kc and control information AC, i.e., license LIC, to encryption processing unit 326. Encryption processing unit 326 encrypts license LID using individual public encryption key KPom2 of memory card 40 obtained from decryption processing unit 320 to generate encrypted data E (Kpom2, LIC) (step S144). Encryption processing unit 328 encrypts encrypted data E (Kpom2, LIC) from encryption processing unit 326 using session key Ks2$a$ obtained from decryption processing unit 320 to generate encrypted data E (Ks2$a$, E (Kpom2, LIC)) (step S146).

Referring to FIG. 10, distribution control unit 315 transmits via bus BS1 and communication device 350 encrypted data E (Ks2$a$, E (Kpom2, LIC)) to terminal device 20.

Upon receiving encrypted data E (Ks2$a$, E (Kpom2, LIC)), controller 1106 of terminal device 20 applies the same to memory card 40 via BS2 and memory card interface 1200 (step S148). Memory card 40 accepts encrypted data E (Ks2$a$, E (Kpom2, LIC)) (step S150). Decryption processing unit 1412 decrypts encrypted data E (Ks2$a$, E (Kpom2, LIC)) applied onto bus BS3 via terminal 1426 and interface 1424 using session key Ks2$a$ to accept encrypted data E (Kpom2, LIC) (step S152). Encrypted data E (Kpom2, LIC) is applied to decryption processing unit 1404. Decryption processing unit 1404 decrypts encrypted data E (Kpom2, LIC) using individual private decryption key Kom2 stored in Kom hold unit 1402 and accepts license LIC (step S154).

Accordingly, the stored location of the license is output from terminal device 20 (step S156). Controller 1420 of memory card 40 accepts the license stored location via terminal 1426, interface 1424 and bus BS3 (step S158). Then, controller 1420 determines whether the license ID included in the received license LIC matches the license ID in log entry 160$i$ stored at step S130 (step S160). When the IDs do not match, controller 1420 outputs an error notification to terminal device 20 via bus BS3, interface 1424 and terminal 1426 (step S162). Terminal device 20 receives and transmits to download server 10 the error notification via memory card interface 1200. Download server 10 receives the error notification (step S164), and the distribution process ends by writing rejection (step S166).

When the two license IDs match at step S160, controller 1420 stores license LIC into the entry specified by the license stored location of license region 1415B (step S168). ST1 region 31 of log entry 160*i* recording the license reception communication is modified to "receive completed" (step S170), and the distribution process ends in a normal manner (step S172).

Although not described above, the valid flag corresponding to the entry storing the license is modified to "valid" when the license is stored in license region 1415B.

When the license distribution process ends, controller 1106 of terminal device 20 issues an encrypted content data distribution request to download server 10. Download server 10 receives this encrypted content data distribution request. Distribution control unit 315 of download server 10 obtains encrypted content data E (Kc, Dc) and additional information Di from information database 304 to transmit these data to terminal device 20 via bus BS1 and communication device 350.

Terminal device 20 receives data E (Kc, Dc) //Di and accepts encrypted content data E (Kc, Dc) and additional information Di. Then, controller 1106 applies encrypted content data E (Kc, Dc) and additional information Di as one content file to memory card 40 via bus BS2 and memory card interface 1200. Controller 1106 also generates a license administration file including the entry number of the license stored in memory card 40, the license ID in plaintext, and the data ID, corresponding to encrypted content data E (Kc, Dc) and additional information Di. The generated license administration file is applied to memory card 40 via bus BS2 and memory card interface 1200. Controller 1106 adds into the reproduction list recorded in memory 1415 of memory card 40 the recorded content file and license administration file name as well as information associated with the encrypted content data extracted from additional information Di (song title, artist's name) and the like as the received content information. Thus, the entire process ends.

By the above-described process, content data can be distributed upon confirming that memory card 40 loaded onto terminal device 20 and storing the license is a proper memory card retaining proper identification data, and that public encryption key KPcm1 is valid. Thus, distribution of content data to an illegal memory card can be inhibited.

Furthermore, mutual authentication between the transmission side and the receiver side of encrypted data can be effected by exchanging encryption keys respectively generated by the distribution server and memory card and apply encryption using each received encryption key, and then send the encrypted data to the other party. Thus, the security of the data distribution system can be improved.

Figure 12:
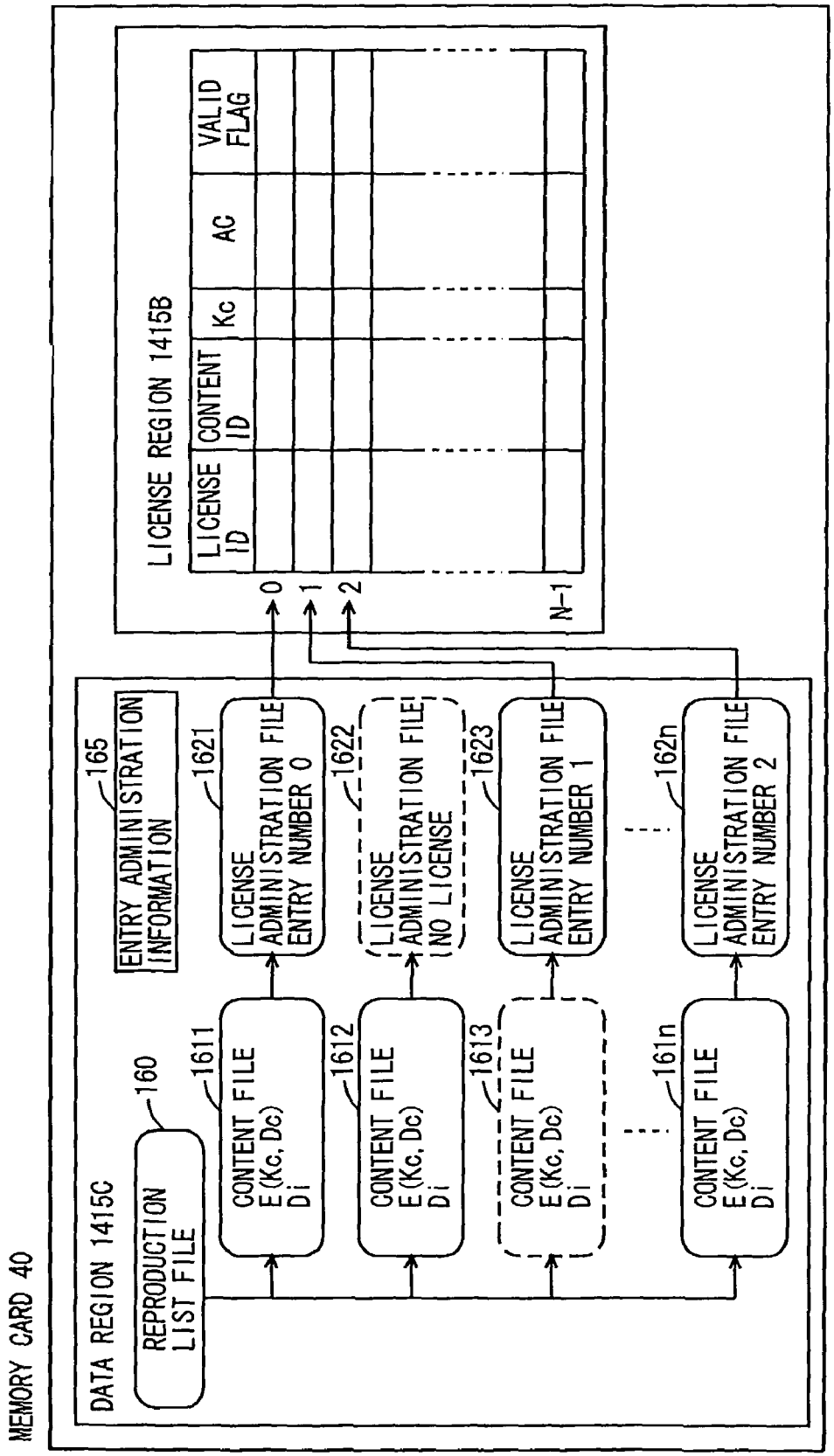
FIG. 12 is a block diagram showing a structure of a reproduction list and license region in a memory card.

FIG. 12 shows license region 1415B and data region 1415C of memory 1415 in memory card 40. Data region 1415C stores a reproduction list file 160, entry administration information 165, content files 1611-161*n*, and license administration files 1621-162*n*. Content files 1611-161*n* store the received encrypted content data E (Kc, Dc) and additional information Di as one file. License administration files 1621-162*n* are recorded corresponding to content files 1611-161*n*, respectively.

Memory card 40 stores encrypted content data and license into memory 1415 when the encrypted content data and license are received from download server 10 or from another memory card through a copy/transfer process.

The license of the encrypted content data transmitted to memory card 40 is recorded in the region specified by the entry number in license region 1415B of memory 1415. The entry number can be obtained by reading the license administration file of reproduction list file 160 stored in data region 1415C of memory 1415. Based on the obtained entry number, the corresponding license can be read out from license region 1415B.

License administration file 1622 depicted in dotted lines indicate that it is not actually recorded. Content file 1612 represents that reproduction is not possible, though present, since there is no license. This corresponds to the case where terminal device 20 has received only encrypted content data from another terminal device.

Content file 1613 indicated in dotted lines corresponds to a case where, for example, terminal device 20 has received encrypted content data and license from download server 10, and has transmitted only the received encrypted content data to another terminal device. This means that encrypted content data is absent whereas the license is present in memory 1415.

[Retransmission]

When the license distribution process of encrypted content data ends in an error (corresponding to an interrupted distribution process by the communication being cut during the steps of S148-S162, S168 and S170 in FIG. 10), it is desirable to allow retransmission of the target license to memory card 40. The reason why the operation during steps S148-S162, S168 and S170 shown in FIG. 10 becomes the subject of license retransmission is that, after encrypted data E (Ks2*a*, E (Kpom2, LIC)) that is an encrypted version of license LIC is output by download server 10 (refer to step S148 of FIG. 10), proper transmission of encrypted data E (Ks2*a*, E (Kpom2, LIC)) actually to memory card 40 can be identified only until an error notification is output from memory card 40 at step S164.

Figure 13:
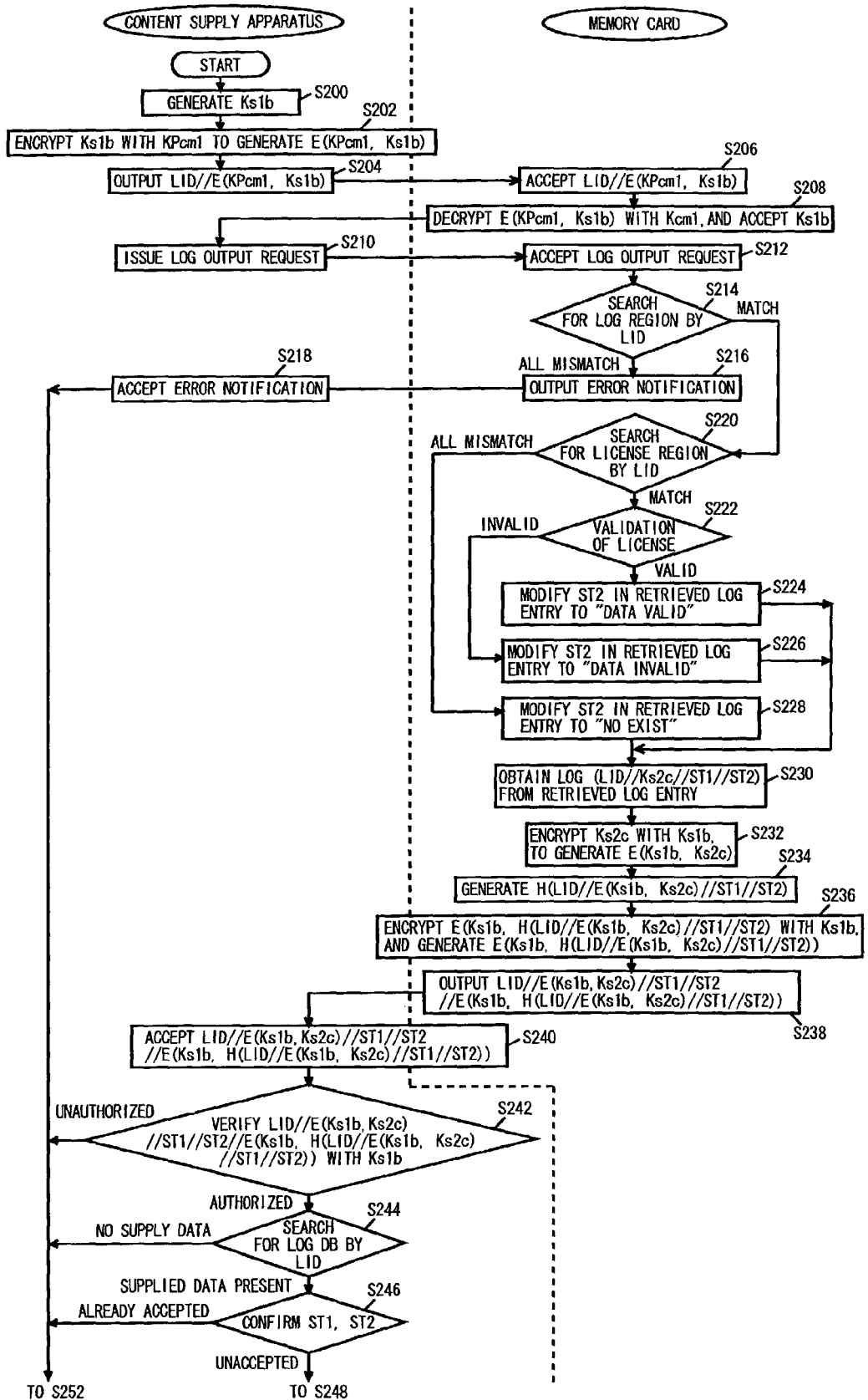
FIGS. 13 and 14 are first and second flow charts, respectively, to describe an operation of redistribution in the data distribution system of FIG. 1.
Figure 14:
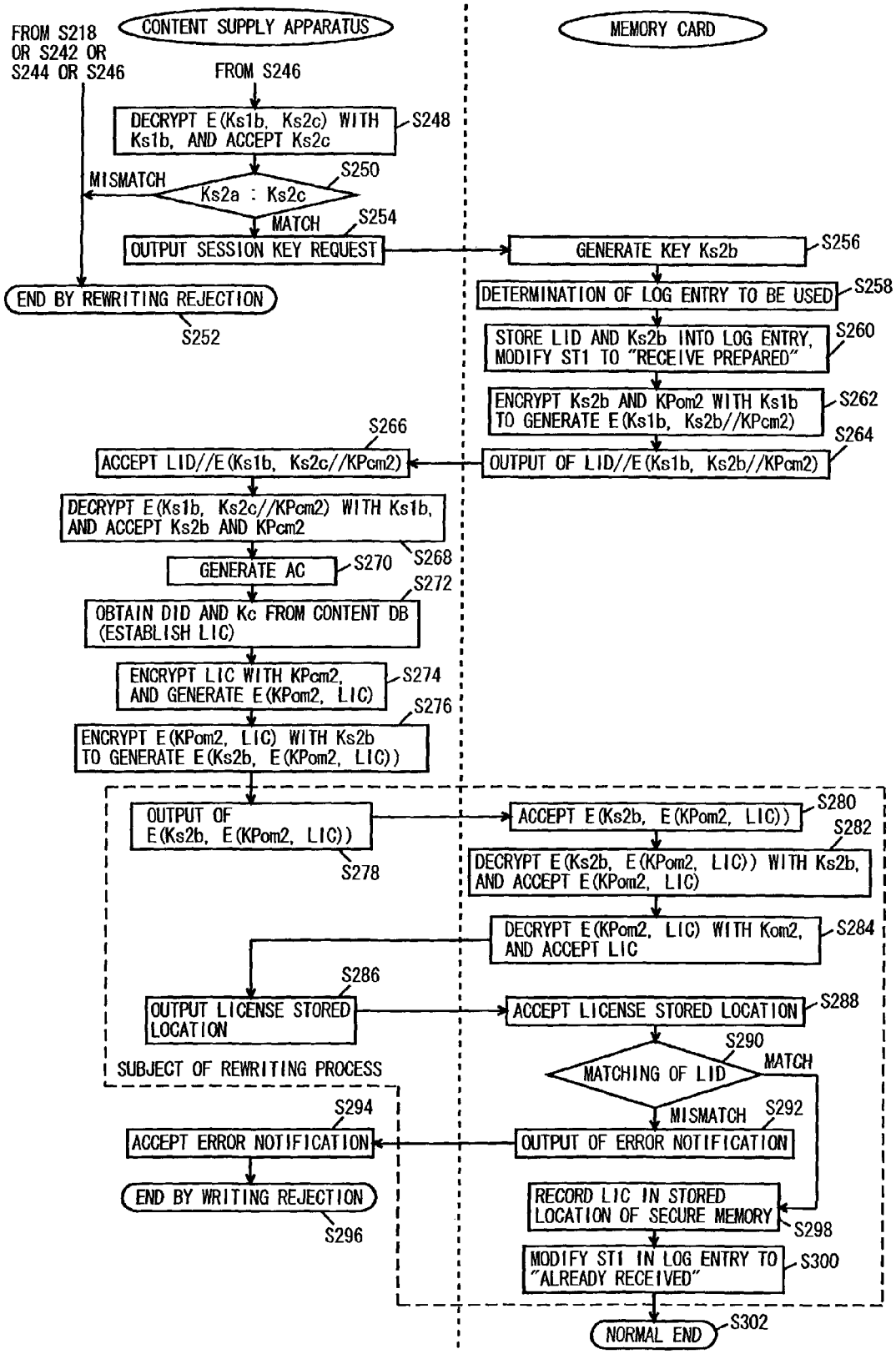

FIGS. 13 and 14 are first and second flow charts, respectively, to describe the operation in the case where a license distribution process is accidentally interrupted and ends, resulting in the loss of the license, and that target license is to be transmitted again to memory card 40.

Referring to FIG. 13, upon commencement of the license retransmission operation, distribution control unit 315 of download server 10 controls session key generation unit 316 so as to generate a session key Ks1*b* required to identify the communication in a license retransmission process. Accordingly, session key generation unit 316 generates a session key Ks1*b* (step S200). Encryption processing unit 318 encrypts session key Ks1*b* using public encryption key KPcm1 of memory card 40 to generate encrypted data E (KPcm1, Ks1*b*) (step S202). Distribution control unit 315 transmits data LID//E (KPcm1, Ks1*b*) corresponding to encrypted data E (KPcm1, Ks1*b*) added with a license ID (LID) to identify the target license to terminal device 20 via bus BS1 and communication device 350. Terminal device 20 receives and transmits data LID//E (KPcm1, Ks1*b*) to memory card 40 via bus BS2 and memory card interface 1200 (step S204). Controller 1420 of memory card 40 receives data LID//E (KPcm1, Ks1*b*) via terminal 1426, interface 1424 and bus BS3 (step S206).

Controller 1420 provides encrypted data E (KPcm1, Ks1*b*) to decryption processing unit 1422. Decryption processing unit 1422 decrypts encrypted data E (KPcm1, Ks1*b*) using private decryption key Kcm1 from Kcm hold unit 1421 and accepts a session key Ks1*b* (step S208).

In response, terminal device 20 issues a log output request to memory card 40 via bus BS2 and memory card interface 1200 (step S210). Controller 1420 of memory card 40 accepts the log output request via terminal 1426, interface 1424 and bus BS3 (step S212). Controller 1420 searches for a log entry that stores history information including a license ID identical to the license ID received at step S206 (step S214). When such a log entry cannot be detected, an error notification is generated and output to terminal device 20 via bus BS3, interface 1424 and terminal 1426 (step S216).

Terminal device 20 receives the error notification from memory card 40 (step S218), and the series of operations ends based on rewriting rejection (step S252).

In the case where a log entry is detected at step S214, a log entry 160$i$ is detected since the process corresponds to an interruption of the procedure shown in FIGS. 9 and 10. Controller 1420 retrieves the entry of license region 1415B according to the license ID received at step S206, and searches for an entry storing a license including the license ID identical to the license ID (step S220).

When an entry storing the license is detected at step S220, controller 1420 determines the validation of the detected license depending upon the corresponding valid flag (refer to FIG. 12) (step S222). When the detected license indicates a "valid" state, ST2 region 32 of log entry 160i detected at step S214 is modified to "data valid" (step S224). When determination is made that the license is invalid at step S222, controller 1420 modifies ST2 region 32 of log entry 160$i$ to "data invalid" (step S226). This means that, when the valid flag included in the license indicates an invalid state, the license actually residing in license region 1415B has been transferred to another memory card or the like, so that no further output of the license from license region 1415B of memory card 40 is inhibited from the standpoint of preventing copying of the license. In other words, an invalid license means that the license has been transferred to another memory card or the like.

No detection of license at step S220 implies that there is no license that is the subject of distribution in memory card 40. Therefore, controller 1420 renders ST2 region 32 of log entry 160$i$ to "data not exist" (step S228).

Following any of steps S224, S226 and S228, controller 1420 obtains history information stored in log entry 160$i$(step S230). Session key Ks2$c$ included in Ks2$w$ region 2 of that history information is extracted and provided to contact Pf of switch 1446. Encryption processing unit 1406 receives session key Ks2$c$ via contact Pf of switch 1446, and receives session key Ks1$b$ via contact Pa of switch 1442. Encryption processing unit 1406 encrypts session key Ks2$c$ using session key Ks1$b$ and provides encrypted data E (Ksb1, Ks2$c$) onto bus BS3(step S232).

Controller 1420 generates log data LID//E (Ks1$b$, Ks2$c$)//ST1//ST2 that is the license ID and status information (ST1, ST2) stored in the history information obtained at step S230 added to encrypted data E (Ks1, Ks2$c$) on bus BS3. The hash value H (LID//E (Ks1$b$, Ks2$c$)//ST1//ST2) of the generated log data LID//E (Ks1$b$, Ks2$c$)//ST1//ST2 is calculated (step S234). Controller 1420 outputs hash value H (LID//E (Ks1$b$, Ks2$c$)//ST1//ST2) to contact Pf of switch 1446 via bus BS3. Encryption processing unit 1406 receives hash value H (LID//E (Ks1$b$, Ks2$c$)//ST1//ST2) via contact Pf of switch 1446 to encrypt the received hash value H (LID//E (Ks1$b$, Ks2$c$)//ST1//ST2) using session key Ks1$b$ to obtain signature data E (Ks1$b$, H (LID//E (Ksb1, Ks2$c$)//ST1//ST2)), which is output onto bus BS3 (step S236).

Controller 1420 adds log data LID//E (Ksb1, Ks2$c$)//ST1/ST2 to signature data E (Ks1$b$, H (LID//E (Ksb1, Ks2$c$)//ST1//ST2)) to generate signatured log data LID//E (Ksb1, Ks2$c$)//ST1/ST2//E (Ks1$b$, H (LID//E (Ks1$b$, Ks2$c$)//ST1//ST2)). Signatured log data LID//E (Ksb1, Ks2$c$)//ST1/ST2//E (Ks1$b$, H (LID//E (Ks1$b$, Ks2$c$)//ST1//ST2)) is output to terminal device 20 via bus BS3, interface 1424 and terminal 1426 (step S238).

Terminal device 20 transmits signatured log data LID//E (Ksb1, Ks2$c$)//ST1/ST2//E (Ks1$b$, H (LID//E (Ks1$b$, Ks2$c$)//ST1//ST2)) from memory card 40 to download server 10. Download server 10 accepts signatured log data LID//E (Ksb1, Ks2$c$)//ST1/ST2//E (Ks1$b$, H (LID//E (Ks1$b$, Ks2$c$)//ST1//ST2)) (step S240).

Distribution control unit 315 provides signature data E (Ks1$b$, H (LID//E (Ks1$b$, Ks2$c$)//ST1//ST2)) to decryption processing unit 320. Decryption processing unit 320 decrypts signature data E (Ks1$b$, H (LID//E (Ks1$b$, Ks2$c$)//ST1//ST2)) using session key Ks1$b$ to output a decrypted hash value H (LID//E (Ks1$b$, Ks2$c$)//ST1//ST2) to distribution control unit 315. Distribution control unit 315 operates on the hash value with respect to log data LID//E (Ks1$b$, Ks2$c$)//ST1//ST2 from signatured log data LID//E (Ksb1, Ks2$c$)//ST1/ST2//E (Ks1$b$, H (LID//E (Ks1$b$, Ks2$c$)//ST1//ST2)) received from memory card 40 to confirm whether the obtained hash value matches hash value H (LID//E (Ks1$b$, Ks2$c$) received from decryption processing unit 320 and operated at memory card 40. Distribution control unit 315 verifies signatured log data LID//E (Ksb1, Ks2$c$)//ST1/ST2//E (Ks1$b$, H (LID//E (Ks1$b$, Ks2$c$)//ST1//ST2)) by confirming that the two hash values matched each other (step S242). Determination is made that signatured log data LID//E (Ksb1, Ks2$c$)//ST1/ST2//E (Ks1$b$, H (LID//E (Ks1$b$, Ks2$c$)//ST1//ST2)) is unauthorized when the two hash values do not match, and the series of operations ends by rewriting rejection (S252). Signatured log data LID//E (Ksb1, Ks2$c$)//ST1/ST2//E (Ks1$b$, H (LID//E Ks1$b$, Ks2$c$)//ST1//ST2)) is authorized when the two hash values match at step S242. Distribution control unit 315 looks into distribution record database (log DB) according to the license ID and searches whether there is a license that is the subject of distribution to memory card 40 (step S244). When the license is not present, control proceeds to step S252, and the series of operations ends by rewriting rejection.

When presence of a license is determined at step S244, determination is made whether memory card 40 has actually accepted a license based on the data in ST1 region 31 and ST2 region 32 of the history information received from memory card 40 (step S246). In the case where memory card 40 has actually received a license, i.e. received and stored in memory 1415, control proceeds to step S252 to end the series of operations by rewriting rejection.

When determination is made that memory card 40 has not actually received the license at step S246, control proceeds to step S248 of FIG. 14.

Referring to FIG. 14, decryption processing unit 320 decrypts encrypted data E (Ksb1, Ks2$c$) using session key Ks1$b$ and accepts session key Ks2$c$ generated at memory card 40 (step S248). Distribution control unit 315 determines whether session key Ks2$a$ (refer to step S138 of FIG. 9) accepted from memory card 40 matches session key Ks2$c$ accepted at step S248 (step S250). When session key Ks2$a$ does not match session key Ks2$c$, control proceeds to step S252 to end the series of operations by rewriting rejection.

In the license distribution process to memory card 40, session key Ks2$a$ is stored in the history information in log region 1415A of memory card 40 (refer to step S130 of FIG. 9). The history information recorded with session key Ks2$a$ is obtained from log region 1415A at step S230 (refer to FIG. 13) and transmitted to download server 10. In respective steps subsequent to step S130, the session key is designated "Ks2c" to explicitly represent a session key included in the history information transmitted from memory card 40 to download server 10 in the license retransmission process to memory card 40. Therefore, session key Ks2a is consistent with session key Ks2c if in a retransmission process following termination by the distribution process error of FIG. 9.

When determination is made that session key Ks2a matches session key Ks2a, distribution control unit 315 issues a session key request to terminal device 20 via bus BS1 and communication device 350.

Terminal device 20 receives and transmits to memory card 40 a session key request via bus BS2 and memory card interface 1200 (step S254). Controller 1420 of memory card 40 receives the session key request via terminal 1426, interface 1424 and bus BS3. Accordingly, controller 1420 provides control of session key generation unit 1418 to cause a session key Ks2b to be generated (step S256). Then, controller 1420 selects a log entry that stores the history information required for recording communication of download server 10 retransmitting a license to memory card 40 (step S258). In this case, log entry 160i is employed.

Controller 1420 stores the license ID received at step S206 and session key Ks2b generated at session key generation unit 148 into log entry 160i, and modifies ST1 to "receive prepared" in ST1 region 31 of log entry 160i (step S260). Then, encryption processing unit 1406 accepts a individual public encryption key Kpom2 from KPom hold unit 1416 via contact Pe of switch 1446, and session key Ks2b via contact Pd of switch 1446 to encrypt session key Ks2b and individual public encryption key KPom using session key Ks1b to generate encrypted data E (Ks1b, Ks2b//Kpom2) for output onto bus BS3(step S262). Controller 1420 adds a license ID to encrypted data E (Ks1b, Ks2b//Kpom2) to output data LID//E (Ks1b, Ks2b//KPom2) to terminal device 20 via a bus BS3, interface 1424 and terminal 1426 (step S264). Terminal device 20 transmits data LID//E (Ks1b, Ks2b//Kpom2) to download server 10. Download server 10 accepts data LID//E (Ks1b, Ks2b//Kpom2) (step S266).

At download server 10, decryption processing unit 320 decrypts encrypted data E (Ks1b, Ks2b//Kpom2) using session key Ks1b, and accepts session key Ks2b and individual public encryption key Kpom2 (step S268). Then, distribution control unit 315 generates control information AC (step S270). The data ID and content key Kc are obtained from information database 304 (step S272).

Distribution control unit 315 provides the license ID, data ID, content key Kc and control information AC, i.e., license LIC, to encryption processing unit 326. Encryption processing unit 326 encrypts license LIC using individual public encryption key Kpom2 of memory card 40 obtained from decryption processing unit 320 to generate encrypted data E (Kpom2, LIC) (step S274). Encryption processing unit 328 encrypts encrypted data E (Kpom2, LIC) from encryption processing unit 326 using session key Ks2a obtained from decryption processing unit 320 to generate encrypted data E (Ks2a, E (Kpom2, LIC)).

Distribution control unit 315 transmits via bus BS1 and communication device 350 encrypted data E (Ks2a, E (Kpom2, LIC)) to terminal device 20.

Upon receiving encrypted data E (Ks2a, E (Kpom2, LIC)), controller 1106 of terminal device 20 applies the same to memory card 40 via bus BS2 and memory card interface 1200 (step S278). Memory card 40 accepts encrypted data E (Ks2a, E (Kpom2, LIC)) (step S280). Decryption processing unit 1412 decrypts encrypted data E (Ks2a, E (Kpom2, LIC)) applied onto bus BS3 via terminal 1426 and interface 1424 using session key Ks2a to accept encrypted data E (Kpom2, LIC) (step S282). Encrypted data E (Kpom2, LIC) is applied to decryption processing unit 1404. Decryption processing unit 1404 decrypts encrypted data E (Kpom2, LIC) using individual private decryption key Kom2 stored in Kom hold unit 1402 and accepts license LIC (step S284).

Accordingly, the stored location of the license is output from terminal device 20 (step S286). Controller 1420 of memory card 40 accepts the license stored location via terminal 1426, interface 1424 and bus BS3(step S288). Then, controller 1420 determines whether the license ID included in the received license LIC matches the license ID in log entry 160I stored at step S130 (step S290). When the IDs do not match, controller 1420 outputs an error notification to terminal device 20 via bus BS3, interface 1424 and terminal 1426 (step S292). Terminal device 20 receives and transmits to download server 10 the error notification via memory card interface 1200. Download server 10 receives the error notification (step S294), and the distribution process ends by writing rejection (step S296).

When the two license IDs match at step S290, controller 1420 stores license LIC into the entry specified by the license stored location of license region 1415B (step S298). ST1 region 31 of log entry 160i recording the license retransmission communication is modified to "receive completed" (step S300), and the distribution process ends in a normal manner (step S302).

When the process of transmitting again the license of encrypted content data to memory card 40 ends in an error (corresponding to the case where the retransmission process is interrupted by the communication being cut in the steps of S278-S292, S298 and S300 of FIG. 14), the license is retransmitted to memory card 40 according to the flow chart shown in FIGS. 13 and 14.

The reason why the operation during the steps of S278-S292, S298 and S300 of FIG. 14 becomes the subject of license retransmission is as described above.

[Transfer/Copy]

In the data distribution system of FIG. 1, memory card 40 loaded onto terminal device 20 can receive encrypted content data and license from download server 10 to have the same recorded. The user of terminal device 20 can arbitrarily copy the encrypted content data recorded in his/her own memory card 40 to memory card 41 loaded onto terminal device 21. Although the user of terminal device 21 has the encrypted content data copied in his/her own memory card 41, the copy encrypted content data cannot be reproduced unless the license required to decrypt the encrypted content data is not obtained.

The copy/transfer of a license from memory card 40 to memory card 41 will be described hereinafter. It is assumed that copy/transfer of a license is conducted between two memory cards 40 and 41 based on the system of FIG. 2. Memory cards 41 and 40 both have the same structure. The class identifier y of memory card 41 is set to y=1, identical to that of memory card 40. The identifier z identifying each memory card is set as z=5.

Figure 15:
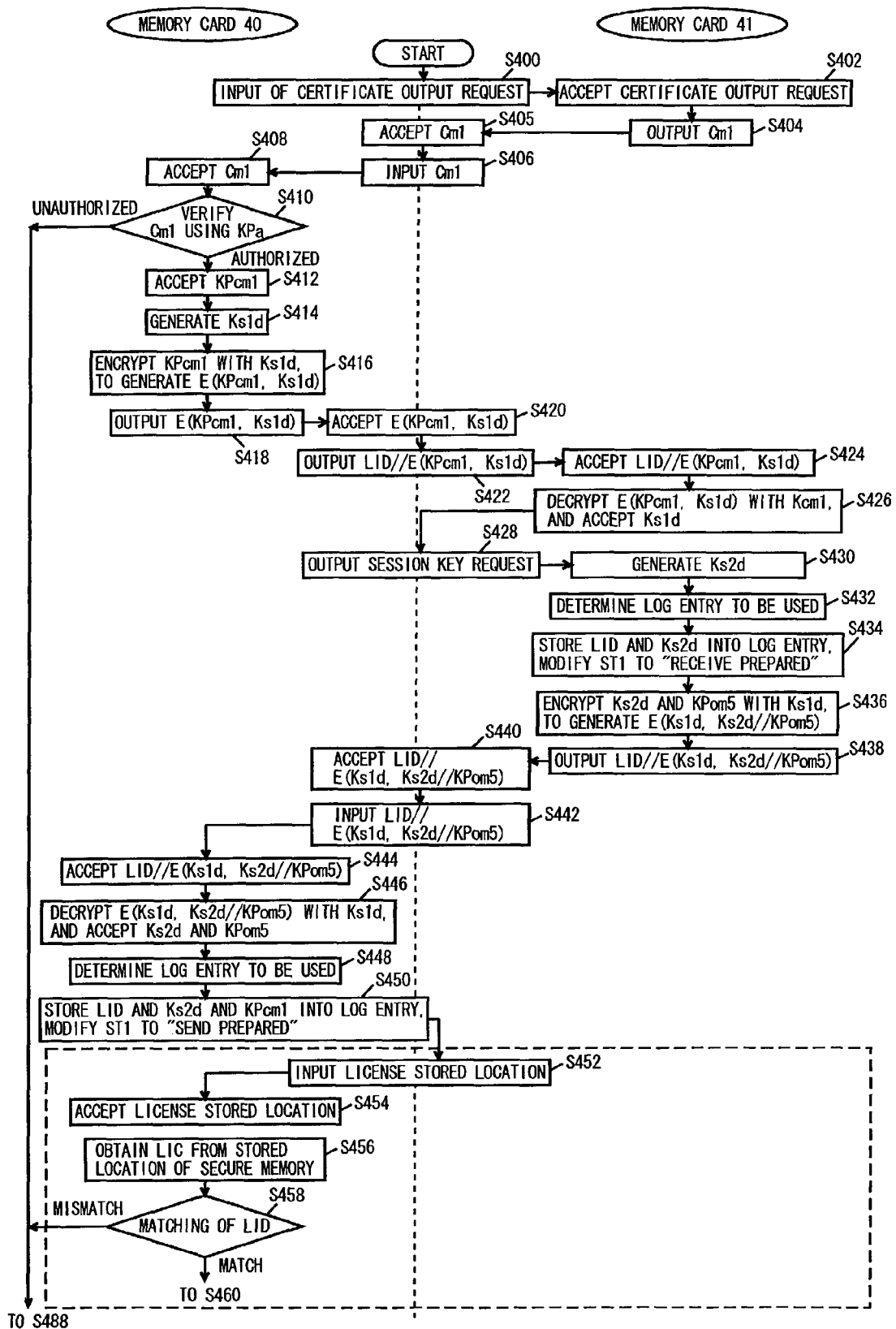
FIGS. 15 and 16 are first and second flow charts, respectively, to describe an operation of copy/transfer between memory cards.
Figure 16:
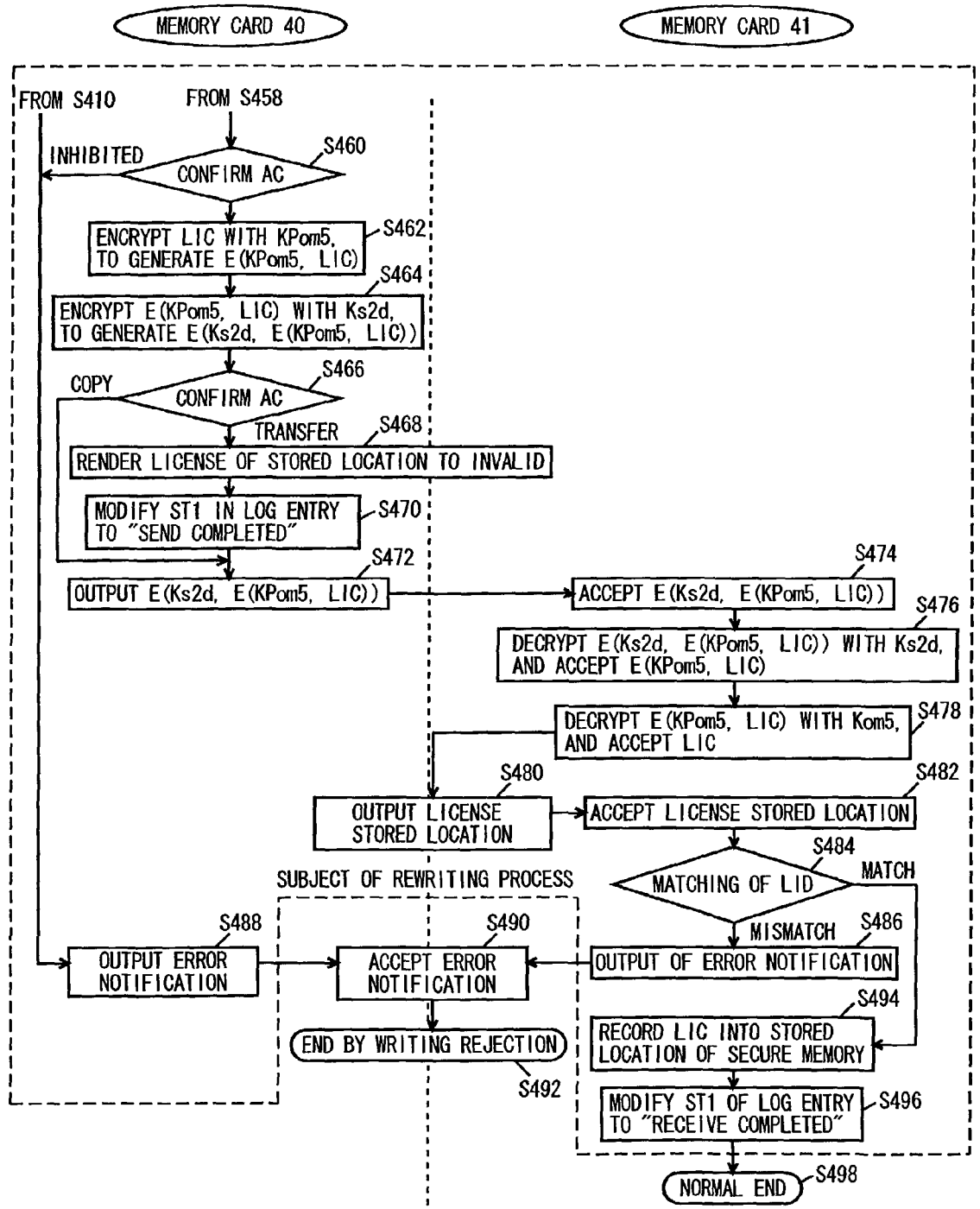

FIGS. 15 and 16 are flow charts for transferring/copying the license recorded in memory card 40 of FIG. 2 to memory card 41. It is assumed that, prior to the process of FIG. 15, controller 1106 of terminal devices 20 and 21 is specified with the content of which the user is to transfer/copy a license and establishes connection with input means (not shown) to conduct a license transfer/copy request, and has received the content specification and license transfer/copy request. It is also assumed that controller 1106 has referred to the reproduction list in memory card 40 of the transmission source to obtain the license administration file corresponding to the license transfer/copy. It is also assumed that respective entry administration information stored in memory card 40 of the transmission source and in memory card 41 of the reception destination are already obtained. Furthermore, it is assumed that confirmation is made of an empty entry in license region 1415B of receiver memory card 41 based on the entry administration information stored in memory card 40 of the transmission source.

Referring to FIG. 15, when the user designates a transfer/copy request, controller 1106 transmits a class certificate output request to memory card 41 via bus BS (step S400). Controller 1420 of memory card 41 receives a class certificate output request via terminal 1426, interface 1424 and bus BS3 (step S402).

Upon receiving the class certificate output request, controller 1420 of memory card 41 reads out class certificate Cm1 from certificate hold unit 1400 via bus BS3, and outputs the class certificate Cm1 to controller 1106 of terminal device 21 via bus BS3, interface 1424 and terminal 1426 (step S404). Controller 1106 accepts class certificate Cm1 via bus BS (step S405). Class certificate Cm1 is transmitted from memory card 40 to memory card 41 via bus BS (step S406).

Controller 1420 of memory card 40 receives class certificate Cm 1 l via terminal 1426, interface 1424 and bus BS3 (step S408), and provides the signatured data E (KPa, H (KPcm1/lcm1)) of the received class certificate Cm1 to decryption processing unit 1408. Decryption processing unit 1408 executes a decryption process of the signatured data E (KPa, H (Kcm1//lcm1)) by authentication key KPa from KPa hold unit 1418, and outputs a hash value H (KPcm1//lcm1) which is a decrypted result thereof onto controller 1420. Controller 1420 operates on the hash value with respect to data KPcm1//lcm1 of class certificate Cm1 to confirm whether the obtained hash value matches hash value H (KPcm1//lcm1) from decryption processing unit 1408. In other words, authentication is conducted of class certificate Cm1 (step S410).

When the two hash values match each other, i.e. when determination is made of a proper class certificate, controller 1420 authorizes and accepts class public encryption key KPcm1 obtained from class certificate Cm1 (step S412). When the two hash values do not match each other, i.e., when determination is made of an illegal class certificate, an unauthorized state is set. Controller 1420 outputs an error notification to controller 1106 of terminal device 20 via bus BS3, interface 1424 and terminal 1426 (step S488). Controller 1106 of terminal device 20 accepts the error notification (step S490), and the series of operations ends by writing rejection (step S492).

When confirmation is made of a license transfer/copy process to a memory card that has a proper class certificate as a result of authentication, controller 1420 at memory card 40 of the transmission source controls session key generation unit 1418 to cause session key generation unit 1418 to generate session key Ks1$d$ for transfer (step S414). Session key Ks1$d$ is encrypted by encryption processing unit 1410 using class public encryption key KPcm1 corresponding to memory card 41 and obtained by decryption processing unit 1408 (step S416). Controller 1420 of memory card 40 obtains encrypted data E (KPcm1, Ks1$d$) via bus BS3, and outputs the same to controller 1106 of terminal device 20 via bus BS3, interface 1424 and terminal 1426 (step S418).

Controller 1106 accepts encrypted data E (KPcm1, Ks1$d$) from the transmission source (step S420), and obtains the license ID from the license administration information of memory card 40 of the transmission source. Controller 1106 applies the obtained license ID and encrypted data E (KPcm1, Ks1$d$) accepted at step S420 as one data, i.e., data LID//E (KPcm1, Ks1$d$) to memory card 41 of the transmission destination via bus BS (step S422). In response, controller 1420 of memory card 41 accepts data LID//E (KPcm1, Ks1$d$) via terminal 1426, interface 424 and bus BS3 (step 424). Controller 1420 provides encrypted data E (KPcm1, Ks1$d$) to decryption processing unit 1422 via bus BS3. Decryption processing unit 1422 applies a decryption process using class decryption key Kcm1 unique to memory card 41, stored in Kcm hold unit 1421, to decrypt and accept session key Ks1$d$ (step S426).

Controller 1106 transmits the session key output request to memory card 41 via bus BS (step S428). Controller 1420 of memory card 41 receives the session key output request via terminal 1426 and interface 1424, and controls session key generation unit 1418 to generate a session key. In response, session key generation unit 1418 generates a session key Ks2$d$ (step S430). Controller 1420 employs a log entry to record the history information of the communication of receiving a license from memory card 40 from the plurality of log entries 1601-160M of log region 1415A according to the predetermined sequence shown in FIG. 11 (step S432). It is assumed that log entry 160$j$ ($1 \leq j \leq M$) is employed.

Then, controller 1420 stores the received license ID and generated session key Ks2$d$ in license ID region 1 and Ks2$w$ region 2, respectively, of log entry 160j, and alters ST1 region 31 in status region 3 to "receive prepared" (step S434).

Encryption processing unit 1406 uses session key Ks1$d$ applied from decryption processing unit 1422 via contact Pa of switch 1442 to encrypt session key Ks2$d$ applied by sequentially switching the contact of switch 1446 as well as individual public encryption key Kpom5 as one data train to output encrypted data E (Ks1$d$, Ks2$d$//Kpom5) onto bus BS3 (step S436). Controller 1420 adds the license ID (LID) to encrypted data E (Ks1$d$, Ks2$d$//Kpom5) output onto BS3 and provides data LID//E (Ks1$d$, Ks2$d$//Kpom5 ) to controller 1106 of terminal device 21 via bus BS3, interface 1424 and terminal 1426 (step S438). Controller 1106 accepts data LID//E (Ks1$d$, Ks2$d$//Kpom5) (step S440). Data LID//E (Ks1$d$, Ks2$d$//Kpom5) is transmitted to memory card 40 via bus BS (step S442).

Controller 1420 of memory card 40 accepts data LID//E (Ks1$d$, Ks2$d$//Kpom5) via terminal 1426, interface 1424 and bus BS3 (step S444). Decryption processing unit 1412 decrypts encrypted data E (Ks1$d$, Ks2$d$//Kpom5) using session key Ks1$d$, and accepts session key Ks2$d$ generated at memory card 41 and individual public encryption key Kpom5 of memory card 41 (step S446). Controller 1420 employs a log entry recording the history information of communication of license copy/transfer to memory card 41 according to the predetermined sequence of FIG. 11 from the plurality of log entries 1601-160M of log region 1415A (step S448). It is assumed that log entry 160$k$ ($1 \leq k \leq M$) is employed. Controller 1420 stores the license ID, session key Ks2$d$ and class public encryption key KPcm1 in license ID region 1, Ks2$w$ region and KPcmy region 4, respectively, of log entry 160$k$ and alters the record of ST1 region 31 of log entry 160$k$ to "send prepared" (step S450).

In response, the stored location of the license is output from controller 1106 of terminal device 20 (step S452). Controller 1420 of memory card 40 accepts the license stored location via terminal 1426, interface 1424 and bus BS3 (step S454). Controller 1420 obtains license LIC from the entry in license region 1415B specified by the received license storage location (step S456). Determination is made whether the license ID included in the obtained license LIC matches the license ID recorded in license ID region 1 of log entry 160*k* at step S450 (step S458). When the license IDs do not match, controller 1420 outputs an error notification to controller 1106 via bus BS3, interface 1424 and terminal 1426 (step S488). Controller 1106 accepts the error notification (step S490), and the series of operations ends by writing rejection (step S492).

When determination is made that the two license IDs match at step S458, control proceeds to step S460 of FIG. 16.

Referring to FIG. 16, controller 1420 of memory card 40 confirms whether copy/transfer of the license to memory card 41 is inhibited or not based on control information AC included in license LIC obtained at step S456 (step S460). When copy/transfer of the license is inhibited, control proceeds to steps S488 and S490, and the series of operations ends by writing rejection (step S492). When copy/transfer is permitted, encryption processing unit 1417 encrypts license LIC using individual public encryption key Kpom5 of memory card 41 (step S462). Encryption processing unit 1406 accepts encrypted data E (Kpom5, LIC) via contact Pc of switch 1446, and further encrypts encrypted data E (Kpom5, LIC) using session key Ks2*d* received via contact Pb of switch 1442 (step S464).

Then, controller 1420 of memory card 40 determines whether license copy is permitted or license transfer is permitted based on control information AC (step S466). When determination is made that license transfer is permitted, the valid flag corresponding to the entry storing the license that is the subject of transfer is set "invalid" (step S468). The record in ST1 region 31 of log entry 160*k* is altered to "send completed" (step S470).

When determination is made that license copy is permitted at step S466, or subsequent to step S470, controller 1420 of memory card 40 outputs encrypted data E (Ks2*d*, E (Kpom5, LIC)) to controller 1106 via bus BS3, interface 1424 and terminal 1426 (step S472).

Controller 1106 receives transmitted encrypted data E (Ks2*d*, E (Kpom5, LIC)), and applies the same to memory card 41 via bus BS. Memory card 41 accepts encrypted data E (Ks2*d*, E (Kpom5, LIC)) (step S474). Decryption processing unit 1412 decrypts encrypted data E (Ks2*d*, E (Kpom5, LIC)) applied via terminal 1426, interface 1424 and bus BS3 using session key Ks2*d*, and accepts encrypted data E (Kpom5, LIC) (step S476). Encrypted data E (Kpom5, LIC) is applied to decryption processing unit 1404. Decryption processing unit 1404 decrypts encrypted data E (Kpom5, LIC) using individual private decryption key Kom5 of memory card 41 stored in Kom hold unit 1402, and accepts license LIC (step S478).

In response, the license stored location is output from controller 1106 (step S480). Controller 1420 of memory card 41 receives the license stored location via terminal 1426, interface 1424 and bus BS3 (step S482). Controller 1420 of memory card 41 determines whether the license ID included in the received license LIC matches the license ID in log entry 160*j* stored at step S434 (step S484). When the license IDs do not match, controller 1420 issues an error notification to controller 1106 of terminal device 21 via bus BS3, interface 1424 and terminal 1426 (step S486). Controller 1106 of terminal device 21 receives and transmits the error notification to terminal device 20. Terminal device 20 accepts the error notification (step S490). Then, the series of operations ends by writing rejection (step S492).

When the two license IDs match each other at step S484, controller 1420 records license LIC into the entry of license region 1415B specified by the license stored location in license region 1415B (step S494). The record in ST1 region 31 of log entry 160*j* that records the license reception communication is altered to "receive completed" (step S496), and the copy/transfer process ends properly (step S498).

The transfer/copy process of encrypted content data from memory card 40 to memory card 41 is to be performed after the license copy/transfer process ends by reading out the encrypted content data from data region 1415C of memory card 40 and transmitting the read out encrypted content data to memory card 41.

In the case where a license administration file corresponding to the transferred/copied license is already recorded at memory card 41 of the receiver side, the license administration file is updated by writing the stored position and the like into the license administration file. In the case where a corresponding license administration file is not recorded in memory card 41, a new license administration file is generated. The generated license administration file is recorded in memory card 41 of the receiver side.

Thus, upon confirming that memory card 41 loaded onto terminal device 21 is a proper card and that class public encryption key KPcm1 is a valid key, the license can be transferred to a proper memory card in response to a transfer request. Therefore, transfer to an illegal memory card can be inhibited.

Furthermore, by exchanging encryption keys generated at respective memory cards to execute encryption using the received encryption key and then transmitting encrypted data to the other party, mutual authentication can be conducted at respective transmission/reception of encrypted data. Therefore, the security in the license transfer/copy operation can be improved.

[Retransmission of Copy/Transfer]

When the license copy/transfer process of encrypted content data ends by accidental interruption (such as the case where the copy/transfer process is interrupted by the communication being cut in the process from step S452 of FIG. 15 to the steps of S486, S494 and S496 of FIG. 16), it is desirable to transmit again the target license to memory card 41.

The reason why the operation during the process from step S452 of FIG. 15 to steps S486, S494 and S496 of FIG. 16 becomes the subject of license retransmission is as described above.

Figure 17:
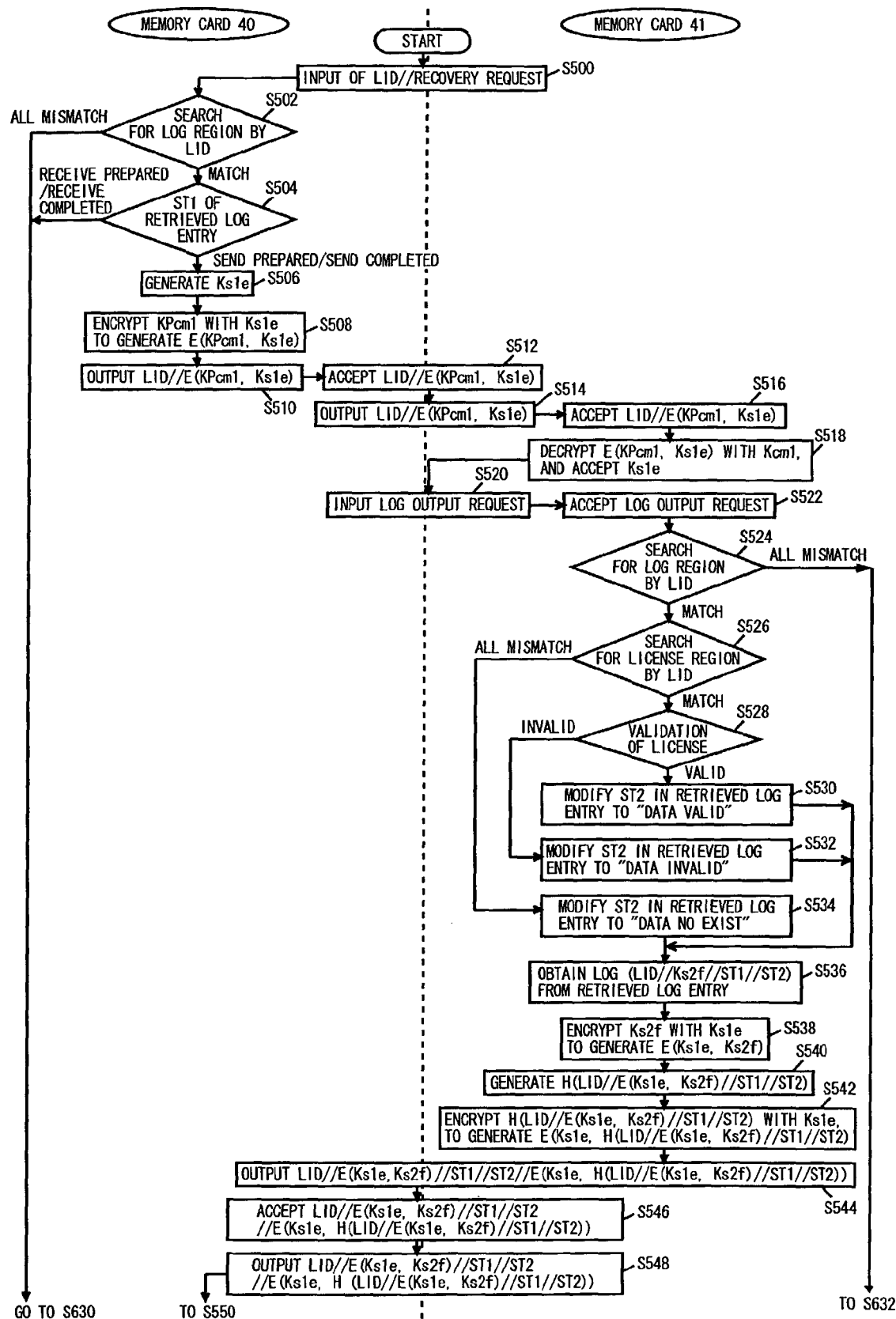
FIGS. 17, 18 and 19 are first, second and third flow charts, respectively, to describe a recommencement of copy/transfer between memory cards.
Figure 18:
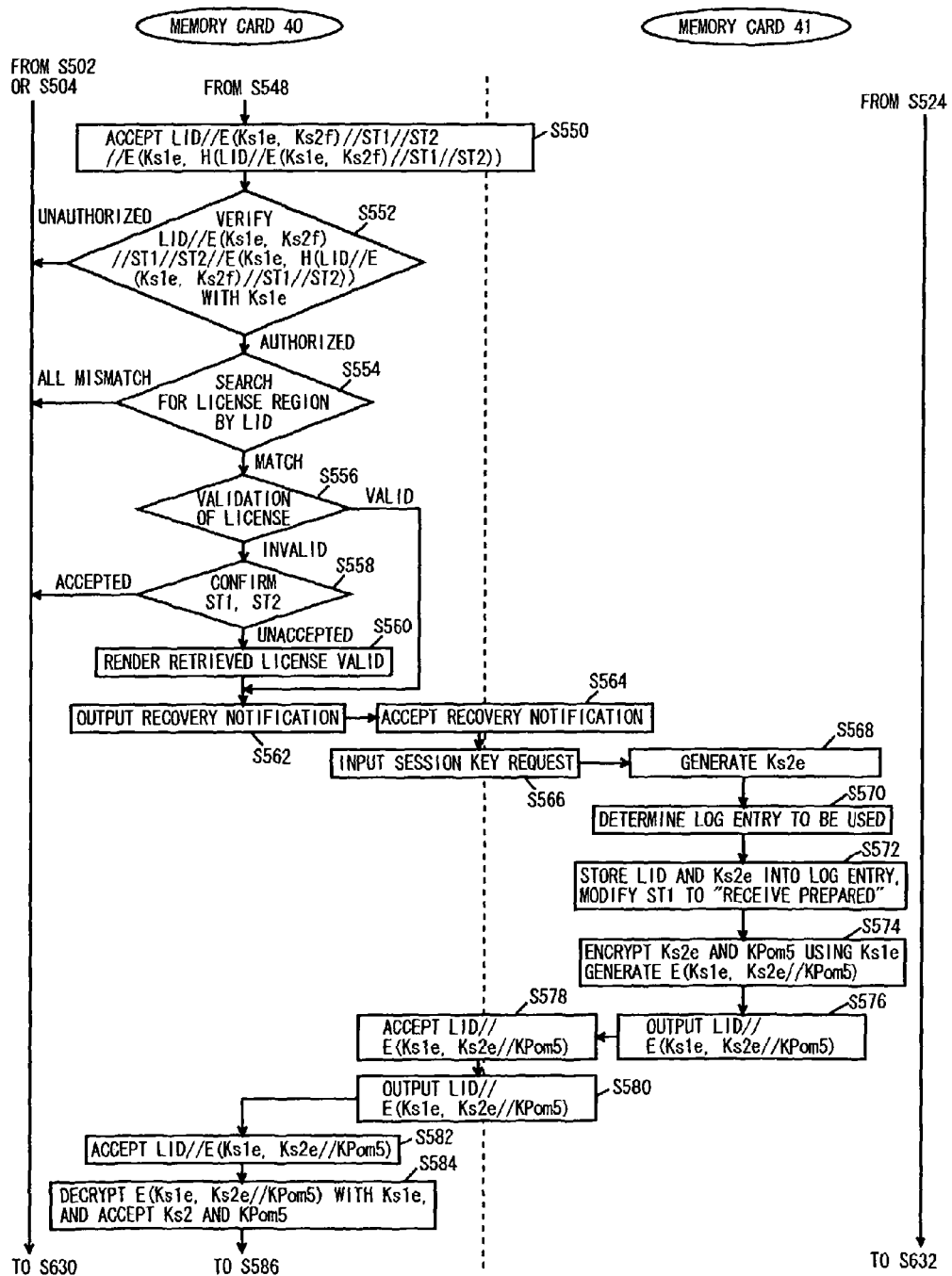
Figure 19:
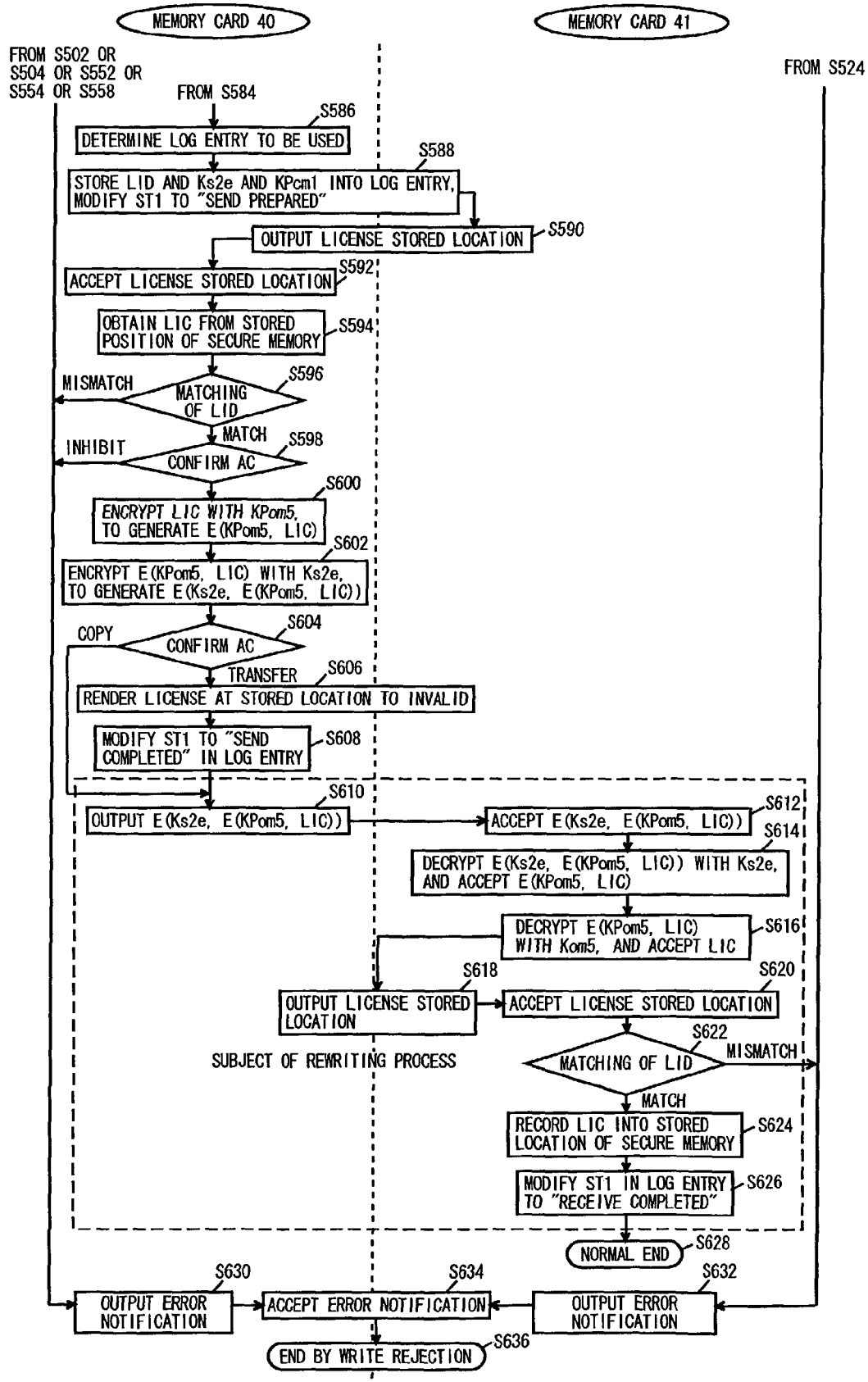

FIGS. 17, 18 and 19 are first, second and third flow charts, respectively, to describe the operation of transmitting the target license to memory card 41 again when the license copy/transfer process has ended in interruption.

Referring to FIG. 17, upon commencement of the retransmission operation of the license/copy transfer process, controller 1106 of terminal 20 transmits a data LID //recovery request to memory card 40 (step S500). Controller 1420 of memory card 40 receives the data LID //recovery request via terminal 1426. interface 1424 and bus BS3. A search is made whether there is a log entry including a license ID identical to the received license ID (LID) (step S502). When the process of FIGS. 15 and 16 ends in an error, the history information stored in log entry 160*k* corresponds to this operation. When there is no history information including the same license ID, controller 1420 of memory card 40 outputs an error notification to controller 1106 via bus BS3, interface 1424 and terminal 1426 (step S630). Controller 1106 receives the error notification (step S634), and the series of operations ends by writing rejection (step S636).

When history information including the same license ID is detected at step S502, controller 1420 of memory card 40 reads out that history information, and determines whether the license has been transmitted to memory card 41 based on the data in ST1 region 31 included in the read out history information (step S504). When the license has been transmitted to memory card 41, control proceeds to step S630, and the series of operations ends by writing rejection (step S636).

When determination is made that the license is not transmitted to memory card 41 at step S504, controller 1420 controls session key generation unit 1408 so as to generate a session key Ks1e required to identify the communication of transmitting a license again to memory card 41. Accordingly, session key generation unit 1418 generates a session key Ks1e (step S506). Encryption processing unit 1410 encrypts session key Ks1e using class public encryption key KPcm1 of memory card 41 included in the read out history information to generate encrypted data E (KPcm1, Ks1e) (step S508). Then, controller 1420 of memory card 40 adds the license ID (LID) that identifies the license that is to be transmitted to encrypted data E (KPcm1, Ks1e), and provides this data LID//E (KPcm1, Ks1e) to controller 1106 via bus BS3, interface 1424 and terminal 1426 (step S510). Controller 1106 receives data LID//E (KPcm1, Ks1e) (step S512), and transmits data LID//E (KPcm1, Ks1e) to memory card 41 via bus BS (step S514). Controller 1420 of memory card 41 accepts data LID//E (KPcm1, Ks1e) via terminal 1426, interface 1424 and bus BS3 (step S516).

Controller 1420 of memory card 41 provides encrypted data E (KPcm1, Ks1e) to decryption processing unit 1422. Decryption processing unit 1422 decrypts the received encrypted data E (KPcm1, Ks1e) using class private decryption key Kcm1 from Kcm unit 1421 to accept session key Ks1e (step S518).

Then, controller 1106 of terminal device 20 issues a log output request to terminal device 21. Controller 1106 of terminal device 21 issues the log output request to memory card 41 via bus BS (step S520). Controller 1420 of memory card 40 accepts the log output request via terminal 1426, interface 1424 and bus BS3 (step S522). Controller 1420 searches for a log entry that records in license ID region 1 a license ID identical to the license ID received at step S516 (step S524). When such a log entry cannot be detected, an error notification is generated and output to controller 1106 of terminal device 21 via bus BS3, interface 1424 and terminal 1426 (step S632). Accordingly, the series of operations ends by writing rejection (steps S634, S636).

When a log entry storing the same license ID is detected at step S524, the process is continued. When the transfer/copy process shown in FIGS. 15 and 16 is interrupted, log entry 160j is detected. Specifically, controller 1420 searches for an entry in license region 1415B based on the license ID received at step S516, and searches for a license including a license ID identical to that license ID (step S526).

When the license is detected at step S526, controller 1420 of memory card 41 determines the validation of the license based on the valid flag (refer to FIG. 12) corresponding to the entry recording the detected license (step S528). When the detected license is valid, the record in ST2 region 32 of log entry 160j is altered to "data valid" at step S524 (step S530). When determination is made that the license is invalid at step S528, controller 1420 alters the record in ST2 region 32 of log entry 160j to "data invalid" (step S532). The meaning of this "data invalid" is as described before.

No detection of a license at step S526 implies that there is no license that is the subject of transmission in memory card 41. Controller 1420 of memory card 41 alters the record in ST2 region 32 of log entry 160j to "data not exist" (step S534).

Following any of steps S530, S532 and S534, controller 1420 of memory card 41 obtains history information (log) LID//Ks2f//ST1//ST2 in log entry 160j (step S536). Session key Ks2f is extracted and output to contact Pf of switch 1446. Encryption processing unit 1406 receives session key Ks2f via contact Pf of switch 1446, and session key Ks1e via contact Pa of switch 1442. Encryption processing unit 1406 encrypts session key Ks2f using session key Ks1e to output encrypted data E (Ks1e, Ks2f) onto bus BS3 (step S538).

Controller 1420 of memory card 41 adds to encrypted data E (Ks1e, Ks2f) on bus BS3 the license ID and status information (ST1, ST2) stored in the history information obtained at step S536 to generate log data LID//E (Ks1e, Ks2f)//ST1//ST2. A hash value H (LID//E (Ks1e, Ks2f)//ST1//ST2) of the generated log data LID//E (Ks1e, Ks2f)//ST1//ST2 is processed (step S540). Controller 1420 outputs hash value H (LID//E (Ks1e, Ks2f)//ST1//ST2) to contact Pf of switch 1446 via bus BS3. Encryption processing unit 1406 receives hash value H (LID//E (Ks1e, Ks2f)//ST1//ST2 ) via contact Pf of switch 1446, and encrypts the received hash value H (LID//E (Ks1e, Ks2f)//ST1//ST2) using session key Ks1e to output signatured data E (Ks1e, H (LID//E (Ks1e, Ks2f)//ST1//ST2)) onto bus BS3 (step S542).

Controller 1420 of memory card 41 adds log data LID//E (Ks1e, Ks2f)//ST1//ST2 to signatured data E (Ks1e, H (LID//E (Ks1e, Ks2f)//ST1//ST2)) to generate signatured log data LID//E (Ks1e, Ks2f)//ST1//ST2//E (Ks1e, H (LID//E (Ks1e, Ks2f)//ST1//ST2)), which is output to controller 1106 of terminal device 21 via bus BS3, interface 1424 and terminal 1426 (step S544).

Controller 1106 accepts the signatured log data LID//E (Ks1e, Ks2f)//ST1//ST2//E (Ks1e, H (LID//E (Ks1e, Ks2f)//ST1//ST2)) from memory card 41 (step S546). The received signatured log data LID//E (Ks1e, Ks2f)//ST1//ST2//E (Ks1e, H (LID//E (Ks1e, Ks2f)//ST1//ST2)) is output to memory card 40 (step S548).

Referring to FIG. 18, controller 1420 of memory card 40 accepts signatured log data LID//E (Ks1e, Ks2f)//ST1//ST2//E (Ks1e, H (LID//E (Ks1e, Ks2f)//ST1//ST2)) via terminal 1426, interface 1424 and bus BS3 (step S550).

In response, controller 1420 provides signatured data E (Ks1e, H (LID//E (Ks1e, Ks2f)//ST1//ST2)) to decryption processing unit 1412. Decryption processing unit 1412 decrypts signatured data E (Ks1e, H (LID//E (Ks1e, Ks2f)//ST1//ST2)) using session key Ks1e, and outputs the decrypted hash value H (LID//E (Ks1e, Ks2f)//ST1//ST2) to controller 1420. Controller 1420 of memory card 41 processes a hash value for log data LID//E (Ks1e, Ks2f)//ST1//ST2, and determines whether the obtained hash value matches hash value H (LID//E (Ks1e, Ks2f)//ST1//ST2) processed at memory card 41. Controller 1420 of memory card 40 verifies the signatured log data LID//E (Ks1e, Ks2f)//ST1//ST2//E (Ks1e, H (LID//E (Ks1e, Ks2f)//ST1//ST2)) received from memory card 41 by confirming that the two hash values match each other (step S552).

When the two hash values do not match each other, the signatured log data LID//E (Ks1e, Ks2f)//ST1//ST2//E (Ks1e, H (LID//E (Ks1e, Ks2f)//ST1/ST2)) is set as "unauthorized", and the series of operations ends by writing rejection (step S636). When the two hash values match at step S552, the signatured log data LID//E (Ks1e, Ks2f)//ST1//ST2//E (Ks1e, H (LID//E (Ks1e, Ks2f)//ST1//ST2)) is set as "authorized". Controller 1420 searches for an entry of license region 1415B by the license ID to detect whether there is the license that is the subject of transmission to memory card 41 (step S554). When the license is not present, control proceeds to step S630 where the series of operations ends by writing rejection (step S636).

In the case where the license is present at step S554, controller 1420 determines the validation of the license depending upon the valid flag corresponding to the entry of the license (step S556). When the license is valid, control proceeds to step S562. When determination is made that the license is invalid at step S556, controller 1420 determines whether the license has been actually received at memory card 41 based on the data in ST1 region 31 and ST2 region 32 of the history information received from memory card 41 (step S558). When the license is actually received already at memory card 41, control proceeds to step S630, and the series of operations ends by writing rejection (step S636).

When determination is made that the license is not actually received at memory card 41 at step S558, controller 1420 of memory card 40 renders the detected license valid (step S560). A recovery notification is output to controller 1106 of terminal device 20 via bus BS3, interface 1424 and terminal 1426 (step S562). Controller 1106 outputs the recovery notification to terminal device 21. Controller 1106 of terminal device 21 accepts the recovery notification (step S564).

In response, controller 1106 transmits the session key request to memory card 41 via bus BS3 (step S556). Controller 1420 of memory card 41 accepts the session key request via terminal 1426, interface 1424 and bus BS3. Controller 1420 controls session key generation unit 1418 to cause session key generation unit 1418 to generate a session key Ks2e (step S568). Controller 1420 selects the history information from log entries 1601-160M of log region 1415A to record the communication of memory card 40 transmitting a license to memory card 41 again according to the flow chart of FIG. 11 (step S570). Here, log entry 160j is employed.

Controller 1420 stores the license ID received at step S516 and session key Ks2e generated by session key generation unit 1418 into log entry 160j, and alters the record of ST1 region 31 in log entry 160j to "receive prepared" (step S572). Then, encryption processing unit 1406 accepts individual public encryption key Kpom5 from KPom hold unit 1416 via contact Pe of switch 1446, and session key Ks2e via contact Pd of switch 1446 to encrypt session key Ks2e and individual public encryption key Kpom5 using session key Ks1e to output encrypted data E (Ks1e, Ks2e//Kpom5) onto bus BS3 (step S574). Controller 1420 adds the license ID to encrypted data E (Ks1e, Ks2e//Kpom5) to output data LID//E (Ks1e, Ks2e//Kpom5) to controller 1106 via bus BS3, interface 1424 and terminal 1426 (step S576). Controller 1106 accepts data LID//E (Ks1e, Ks2e//Kpom5) (step S578). Controller 1106 outputs data LID//E (Ks1e, Ks2e//Kpom5) to memory card 40 (step S580). Controller 1420 of memory card 40 accepts data LID//E (Ks1e, Ks2e//Kpom5) via terminal 1426, interface 1424 and bus BS3 (step S582).

Decryption processing unit 1412 of memory card 40 decrypts encrypted data E (Ks1e, Ks2e//Kpom5) using session key Ks1e, and accepts session key KS2e and individual public encryption key Kpom5(step S584).

Referring to FIG. 19, following step S584, controller 1420 selects a log entry to record communication of transmitting again a license to memory card 41 from the plurality of log entries 1601-160M (step S582) according to the predetermined sequence shown in FIG. 11 (step S586). Here, log entry 160k is selected. Controller 1420 stores the received license ID, session key Ks2e generated by session key generation unit 1418, and class public encryption key KPcm1into license ID region 1, Ks2w region 2 and KPcmy region 4 of the employed log entry 160k, and alters ST1 region 31 of log entry 160k to "send prepared" (step S588).

In response, the license stored location is output from controller 1106 to memory card 40 (step S590). Controller 1420 of memory card 40 accepts the license stored location via terminal 1426, interface 1424 and bus BS3 (step S592). Controller 1420 obtains the license LIC from the entry specified by the received license stored location (step S594). Determination is made whether the license ID included in the obtained license LIC matches the license ID stored in log entry 160j at step S588 (step S596). When the license IDs do not match, controller 1420 issues an error notification to controller 1106 via bus BS3, interface 1424 and terminal 1426 (step S630). Controller 1106 receives the error notification (step S634), and the series of operations ends by writing rejection (step S636).

When determination is made that the two license IDs match each other at step S596, controller 1420 confirms whether the copy/transfer of a license to memory card 41 is inhibited or not based on control information AC in license LIC obtained at step S594 (step S598). When copy/transfer is inhibited, control proceeds to steps S630 and S634 to result in the end of the series of operations by writing rejection (step S636). When copy/transfer is permitted, encryption processing unit 1417 encrypts license LIC using individual public encryption key Kpom5of memory card 41 (step S600). Encryption processing unit 1406 accepts encrypted data E (Kpom5, LIC) via contact Pc of switch 1446, and further encrypts encrypted data E (Kpom5, LIC) using session key Ks2e received via contact Pb of switch 1442 (step S602).

In response, controller 1420 determines whether license copy is permitted or license transfer is permitted based on control information AC (step S604). When determination is made that license transfer is permitted, the valid flag corresponding to the entry storing the license that is the subject of transfer is set to "invalid" (step S606). The record in ST1 region 31 of log entry 160k is altered to "send completed" (step S608).

When determination is made that license copy is permitted at step S604, or following step S608, controller 1420 output encrypted data E (Ks2e, E (Kpom5, LIC)) to controller 1106 via bus BS3, interface 1424 and terminal 1426 (step S610).

Controller 1106 receives the transmitted encrypted data E (Ks2e, E (Kpom5, LIC)), and applies the same to memory card 41 via bus BS. Memory card 40 accepts encrypted data E (Ks2e, E (Kpom5, LIC)) (step S612). Decryption processing unit 1412 uses session key Ks2e to decrypt encrypted data E (Ks2e, E (Kpom5, LIC)) applied via terminal 1426, interface 1424 and bus BS3, and accepts encrypted data E (Kpom5, LIC) (step S614). Encrypted data E (Kpom5, LIC) is applied to decryption processing unit 1404. Decryption processing unit 1404 decrypts encrypted data E (Kpom5, LIC) using individual private decryption key Kom5 stored in Kom hold unit 1402, and receives license LIC (step S616).

In response, the license stored location is output from controller 1106 to memory card 41 (step S618). Controller 1420 of memory card 41 receives the license stored location via terminal 1426, interface 1424 and bus BS3 (step S620). Then, controller 1420 of memory card 41 determines whether the license ID included in the received license LIC matches the license ID stored in license ID region 1 of log entry 160j of step S572 (step S622). When the license IDs do not match each other, controller 1420 outputs an error notification to controller 1106 of terminal device 21 via bus BS3, interface 1424 and terminal 1426 (step S632). Controller 1106 receives the error notification (step S634), and the series of operations ends by writing rejection (step S636).

When the two license IDs match each other at step S622, controller 1420 of memory card 41 stores license LIC into the location specified by the license stored location in license region 1415B of the license LIC (step S624). The record in ST1 region 31 of log entry 160j is altered to "receive completed" (step S626), and the copy/transfer retransmission process ends properly (step S628).

The copy/transfer of encrypted content data from memory card 40 to memory card 41 is to be conducted after the license transfer/copy operation ends by reading out and transmitting to memory card 41 the encrypted content data from data region 1415C of memory card 40.

In the case where the session of transmitting again the license of the encrypted content data to memory card 41 ends in an error (this corresponds to the interruption of the retransmission process due to the communication being cut in the steps of S610-S626 of FIG. 19), the license is transmitted again to memory card 41 according to the flow chart of FIGS. 17-19.

The reason why the operation during steps S610-S626 of FIG. 19 becomes the subject of license retransmission is as described previously.

[Reproduction]

Memory card 40 loaded onto terminal device 20 can directly receive the encrypted content data and license from download server 10. Furthermore, memory card 41 can receive the encrypted content data and license from memory card 40 through the operation of "transfer".

Reproduction of encrypted data received by a memory card through various methods will be described hereinafter.

Figure 20:
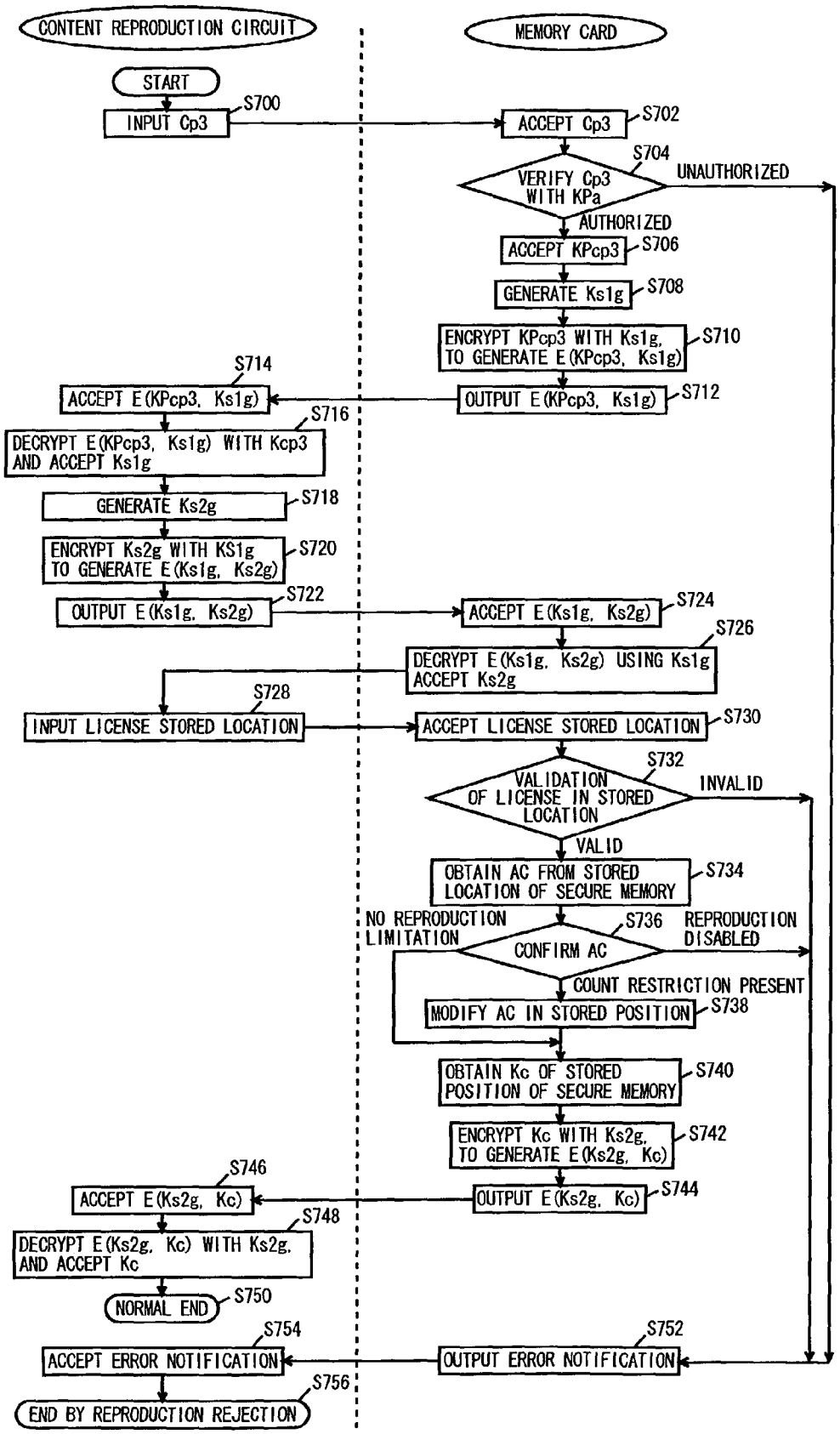
FIG. 20 is a flow chart to describe a reproduction operation of encrypted content data at a terminal device.

FIG. 20 is a flow chart to describe a reproduction operation at content reproduction circuit 1550 of terminal device 20 with respect to encrypted content data E (Kc, Dc) received at memory card 40. Reproduction is allowed by loading memory card 41 to terminal device 20, which in case reproduction is carried out according to the flow chart of FIG. 20. It is assumed that, prior to the process of FIG. 20, the user of terminal device 20 has determined the content (music) to be reproduced, identified the content file, and obtained the license administration file according to the reproduction list recorded in data region 1415C of memory card 40.

Referring to FIG. 20, upon commencement of a reproduction operation, a reproduction request is input by the user of terminal device 20 via operation panel 1108. In response, controller 1106 outputs a class certificate output request to content reproduction circuit 1550 via bus BS2. Content reproduction circuit 1550 outputs a class certificate Cp3. Controller 1106 applies class certificate Cp3 to memory card 40 via bus BS2 and memory card interface 1200 (step S700).

Memory card 40 accepts class certificate Cp3=KPcp3//Icp3//E (Ka, H (KPcp3//Icp3)). Decryption processing unit 1408 decrypts signatured data E (Ka, H (KPcp3//Icp3) among the received class certificate Cp3 using authentication key KPa stored in KPa hold unit 1414. The decrypted hash value H (KPcp3//Icp3) is output to controller 1420. Controller 1420 processes the hash value for data KPcp3//Icp3 from class certificate Cp3, and determines whether the processed hash value matches hash value H (KPcp3//Icp3) processed at content reproduction circuit 1550. Class certificate Cp3 received from content reproduction circuit 1550 is verified by confirming that the two hash values match each other (step S704). When the two hash values do not match each other, class certificate Cp3 is set as "unauthorized". Controller 1420 outputs an error notification to controller 1106 of terminal device 20 via bus BS3, interface 1424 and terminal 1426 (step S752). Controller 1106 accepts the error notification (step S754), and the series of operations ends by reproduction rejection (step S756).

When the two hash values match each other, class certificate Cp3 is set as "authorized". Controller 1420 accepts public encryption key KPcp3 (step S706), and controls session key generation unit 1418 so as to generate a session key. In response, session key generation unit 1418 generates a session key Ks1g for the reproduction process (step S708).

Encryption processing unit 1410 encrypts session key ks1g from session key generation unit 1418 using class public encryption key KPcp3 decrypted at decryption processing unit 1408 to provide encrypted data E (KPcp3, Ks1g) onto bus BS3 (step S710). Controller 1420 outputs encrypted data E (KPcp3, Ks1g) to memory card interface 1200 via interface 1424 and terminal 1426 (step S712). Controller 1106 of terminal device 20 accepts encrypted data E (KPcp3, Ks1g)via memory card interface 1200 (step S714). Controller 1106 provides encrypted data E (KPcp3, Ks1g) to decryption processing unit 1504 of content reproduction circuit 1500 via bus BS2. Decryption processing unit 1504 decrypts encrypted data E (KPcp3, Ks1g) using class private decryption key Kcp3 output from Kcp hold unit 1502 and that is the companion of public encryption key KPcp3, and output session key Ks2g to encryption processing unit 1506 (step S716). Session key generation unit 1508 generates session key Ks2g for the reproduction process. The generated session key Ks2g is output to encryption processing unit 1506 (step S718). Encryption processing unit 1506 encrypts session key Ks2g from session key generation unit 1508 using session key Ks1g from decryption processing unit 1504 to generate encrypted data E (Ks1g, Ks2g) (step S720). Controller 1106 outputs encrypted data E (Ks1g, Ks2g) to memory card 40 via bus BS3and memory card interface 1200 (step S722).

Decryption processing unit 1412 at memory card 40 inputs encrypted data E (Ks1g, Ks2g) via terminal 1426, interface 1424 and bus BS3 (step S724). Decryption processing unit 1412 uses session key Ks1g generated at session key generation unit 1418 to decrypt encrypted data E (Ks1g, Ks2g), and accepts session key Ks2g generated at terminal device 20 (step S726).

Controller 1106 of terminal device 20 obtains the license stored location from the license administration file of the reproduction requested song obtained previously from memory card 40, and outputs the obtained stored location to memory card 40 via memory card interface 1200 (step S728).

Controller 1420 of memory card 40 accepts the stored location (S730), and obtains a valid flag corresponding to the license and entry stored in the entry specified by the received stored location. Controller 1420 confirms validation of the license based on the valid flag (step S732). An "invalid" license at step S732 implies that the license is not present at the specified entry. Control proceeds to steps S752 and S754 to end the reproduction operation by reproduction rejection (step S756). A "valid" license at step S732 implies that there is the license in the entry of the specified stored location. Therefore, the license is obtained (step S734).

Then, controller 1420 confirms control information AC (step S736).

By confirming control information AC at step S736, i.e., confirming the reproduction count, the reproduction operation is terminated when the state of "reproduction disabled" is attained. In the case where the reproduction count in control information AC is limited, the reproduction count in control information AC is updated (step S738). Then, control proceeds to the next step (step S740).

In the case where reproduction is not limited by the reproduction count in control information AC, control skips step S738 to the next step (step S740) without the reproduction count of control information AC being modified.

When determination is made that the reproduction operation is allowed at step S736, content key Kc of the reproduction requested song recorded in license region 1415B of memory 1415 is output onto bus BS3 (step S740).

The obtained content key Kc is transmitted to encryption processing unit 1416 via contact Pc of switch 1446. Encryption processing unit 1406 uses session key Ks2g received from decryption processing unit 1412 via contact Pb of switch 1442 to encrypt content key Kc received via switch 1446 (step S742), and outputs encrypted data E (Ks2g, Kc) onto bus BS3 (step S744).

Encrypted data E (Ks2g, Kc) output onto bus BS3 is transmitted to controller 1106 of terminal device 20 via interface 1424 and memory card interface 1200.

Controller 1106 at terminal device 20 accepts encrypted data E (Ks2g, Kc) transmitted onto bus BS2 via memory card interface 1200 (step S746). The accepted encrypted data E (Ks2g, Kc) is output to decryption processing unit 1510. Decryption processing unit 1510 decrypts encrypted data E (Ks2g, Kc) using session key Ks2g, and accepts content key Kc (step S748). Decryption processing unit 1510 outputs content key Kc to decryption processing unit 1516.

Controller 1106 sends a request of encrypted content data E (Kc, Dc) to memory card 40 via memory card interface 1200. In response, controller 1420 of memory card 40 obtains encrypted content data E (Kc, Dc) from memory 1415, and outputs encrypted content data E (Kc, Dc) to memory card interface 1200 via bus BS3, interface 1424, and terminal 1426.

Controller 1106 of terminal device 20 obtains encrypted content data E (Kc, Dc) via memory card interface 1200, and provides encrypted content data E (Kc, Dc) to content reproduction circuit 1550 via bus BS2.

Decryption processing unit 1516 of content reproduction circuit 1550 decrypts encrypted content data E (Kc, Dc) using content key Kc from decryption processing unit 1510 to obtain content data Dc.

The decrypted content data Dc is output to music reproduction unit 1518. Music reproduction unit 1518 reproduces the content data. DA converter 1519 converts digital signals into analog signals for output to terminal 1530. The music data is output from terminal 1530 to a headphone via an external output device to be reproduced. Thus, the reproduction operation ends properly (step S750).

The above description is based on a license recovery process taking a license required to decrypt encrypted content data as an example. In the present invention, the subject of recovery is not limited to a license required to decrypt encrypted content data. Data such as private information and credit card information of which secrecy is required is the subject of recovery. Such data can be subjected to the above-described various processes.

The operation can be readily realized by replacing the data required of secrecy with content key Kc in the license.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage apparatus to input/output classified data according to a predetermined procedure, and storing said classified data, comprising:
   an interface for data input/output with an external source,
   a data storage unit storing said classified data,
   a plurality of log storage units storing history information associated with input/output of said classified data,
   a control unit controlling input/output of said classified data,
   each of the plurality of history information stored in said plurality of log storage units including identification information to identify classified data, status information recording a progress status of an input/output process classified data, and input/output identification information identifying input/output status of classified data,
   wherein said control unit selects, when there is no log storage unit storing history information including said received identification information in said plurality of log storage units, one of said plurality of log storage units that stores history information indicating that input of another classified data that is not the subject of input/output is completed according to said status information;
   further comprising a log administration storage unit to administer a usage sequence of each of said plurality of log storage units,
   wherein said control unit selects, when there is no log storage unit storing history information including said received identification information in said plurality of log storage units, a log storage unit storing history information of the lowest usage probability according to a predetermined procedure, and stores history information according to the progress of the procedure for classified data input/output into said selected log storage unit.

2. The storage apparatus according to claim 1, wherein said control unit selects, when there is no log storage unit storing history information indicating that input of another classified data is completed according to said status information, one of said plurality of log storage units that stores history information indicating an output waiting status of another classified data according to said status information, and stores history information according to the progress of the procedure for classified data input/output to said selected log storage unit.

3. The storage apparatus according to claim 1, wherein said predetermined sequence includes a sequence of a log storage unit storing history information whose status information indicates a status where classified data will not be lost, and a log storage unit storing history information determined as to be oldest by said log administration unit.

4. The storage apparatus according to claim 1, wherein, in an input procedure of receiving supply of said classified data from an external source, said control unit stores, upon obtaining identification information of classified data that is a subject of input via the interface from an external source, said obtained identification information and input/output identification information identifying the input procedure into the selected log storage unit, modifies the status information stored in said selected log storage unit to an input waiting status, and upon obtaining classified data from an external source via said interface, modifies the status information stored in said selected log storage unit to an already input status.

5. The storage apparatus according to claim 1, further comprising a temporary key generation unit generating a temporary key to be output to an external source via said interface to establish an encryption communication path to conduct input/output of said classified data safely,
   wherein, in said input procedure, said control unit stores into said selected log storage unit the temporary key generated at said temporary key generation unit as said input/output identification information.

6. The storage apparatus according to claim 1, wherein said classified data includes identification information identifying said classified data,
   wherein, in said input procedure, said control unit stores input classified data in said data storage unit when first identification information included in history information stored in said selected log storage unit matches second identification information included in said input classified data, and issues an error notification to an external source via said interface when said first identification information does not match said second identification information.

7. The storage apparatus according to claim 1, wherein said control unit searches said plurality of log storage units for a log storage unit that stores history information including identification information matching externally applied identification information according to identification information and a history information output request applied from an external source via the interface, and when there is a log storage unit storing history information including identification information that matches said externally applied identification information, outputs all or a portion of history information stored in said log storage unit for output via said interface.

8. The storage apparatus according to claim 7, further comprising a signature value functional unit for carrying out an operation of a signature value for data using to a key obtained from an external source via said interface,
  wherein said signature value functional unit carries out an operation of a signature value for all or a portion of said history information to generate said signature value,
  wherein said control unit outputs all or a portion of said history information and a signature value for said history information to an external source via said interface.

9. A storage apparatus to input/output classified data according to a predetermined procedure, and storing said classified data, comprising:
  an interface for data input/output with an external source,
  a data storage unit storing said classified data,
  a plurality of log storage units storing history information associated with input/output of said classified data,
  a control unit controlling input/output of said classified data,
  each of the plurality of history information stored in said plurality of log storage units including identification information to identify classified data, status information recording a progress status of an input/output process classified data, and input/output identification information identifying input/output status of classified data,
  wherein said control unit selects, when there is no log storage unit storing history information including said received identification information in said plurality of log storage units, one of said plurality of log storage units that stores history information indicating that input of another classified data that is not the subject of input/output is completed according to said status information;
  further comprising a log administration storage unit to administrate a usage sequence of each of said plurality of log storage units,
  wherein said control unit selects, when there is no log storage unit storing history information including said received identification information in said plurality of log storage units, a log storage unit storing history information of the lowest usage probability according to a predetermined procedure, and stores history information according to the progress of the procedure for classified data input/output into said selected log storage unit,
  wherein, in an output procedure to provide said classified data to an external source, said control unit stores, upon obtaining identification information identifying classified data to be output and input/output identification information specifying output of said classified data via said interface, said obtained identification information and input/output identification information into said selected log storage unit, modifies the status information stored in said selected log storage unit to an output waiting status, and upon providing said classified data to an external source via said interface, modifying the status information stored in said selected log storage unit to an already input status.

10. The storage apparatus according to claim 9, wherein, in said output procedure, said control unit obtains from an external source a temporary key via said interface to establish an encryption communication path to conduct input/output of said classified data safely, and storing said obtained temporary key into said selected log storage unit as said input/output identification information.

11. The storage apparatus according to claim 9, wherein said classified data includes identification information identifying relevant classified data,
  wherein, in said output procedure, said control unit outputs said history information stored in said data storage unit to an external source via said interface when the first identification information included in the history information stored in said selected log storage unit matches the second identification information included in classified data stored in said data storage unit, and outputs an error notification via said interface when said first and second identification information do not match.

12. The storage apparatus according to claim 1, wherein said control unit searches, upon obtaining history information input from an external source via said interface, said plurality of log storage units for a log storage unit that stores history information including second identification information matching first identification information included in said history information input from an external source, and when there is such a log storage unit storing history information including said second identification information, determines whether to output classified data corresponding to said second identification information to an external source via said interface based on the history information stored in said such a log storage unit and said history information input from an external source.

* * * * *